United States Patent
Adams et al.

(10) Patent No.: US 10,788,108 B2
(45) Date of Patent: Sep. 29, 2020

(54) ACTUATOR FOR A VEHICLE CLOSURE AND METHOD OF ACTUATING A VEHICLE CLOSURE

(71) Applicant: Strattec Power Access LLC, Auburn Hills, MI (US)

(72) Inventors: Mark E. Adams, Troy, MI (US); Howard Kuhlman, Rochester Hills, MI (US); Daniela Kowalski, Shelby Township, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 193 days.

(21) Appl. No.: 15/592,512

(22) Filed: May 11, 2017

(65) Prior Publication Data
US 2017/0328450 A1 Nov. 16, 2017

Related U.S. Application Data

(60) Provisional application No. 62/334,765, filed on May 11, 2016.

(51) Int. Cl.
*F16H 25/20* (2006.01)
*E05F 15/616* (2015.01)

(52) U.S. Cl.
CPC ....... *F16H 25/2056* (2013.01); *E05F 15/616* (2015.01); *F16H 25/2015* (2013.01); *E05Y 2201/704* (2013.01); *E05Y 2800/122* (2013.01); *E05Y 2900/548* (2013.01)

(58) Field of Classification Search
CPC ....... F16H 2025/204; F16H 2025/2031; F16H 25/20; F16H 2025/2065; F16H 2025/2071; F16H 25/2015; F16H 25/2056; E05F 15/622; E05F 15/616; E05Y 2900/546; E05Y 2900/548; E05Y 2800/122; E05Y 2800/114; E05Y 2800/112; E05Y 2800/404
USPC .......... 74/89.28–29, 89.34–35, 89.37, 89.45, 74/490.11, 479.01, 625; 296/56, 146.8, 296/76, 146.4
See application file for complete search history.

(56) References Cited

U.S. PATENT DOCUMENTS

| | | | | |
|---|---|---|---|---|
| 4,712,441 A | * | 12/1987 | Abraham | F16H 25/2015 74/412 TA |
| 6,457,675 B1 | * | 10/2002 | Plude | B64C 1/1415 244/129.5 |
| 2007/0144846 A1 | * | 6/2007 | Bucheton | F16H 25/205 188/297 |
| 2014/0290403 A1 | * | 10/2014 | Wu | F16H 25/2056 74/89.35 |
| 2016/0195115 A1 | * | 7/2016 | Fenn | B64C 25/30 92/82 |

* cited by examiner

*Primary Examiner* — Randell J Krug
(74) *Attorney, Agent, or Firm* — Michael Best & Friedrich LLP

(57) ABSTRACT

An actuator for opening and closing a decklid or other closure on a motor vehicle is described and shown. The actuator can include a motor, a rod coupled to and driven by the motor, a first sleeve coupled to and driven by the rod, and a second sleeve coupled to and driven by the first sleeve. The first and second sleeves can be slidably coupled to one another, and/or can be rotatably locked relative to one another.

20 Claims, 20 Drawing Sheets

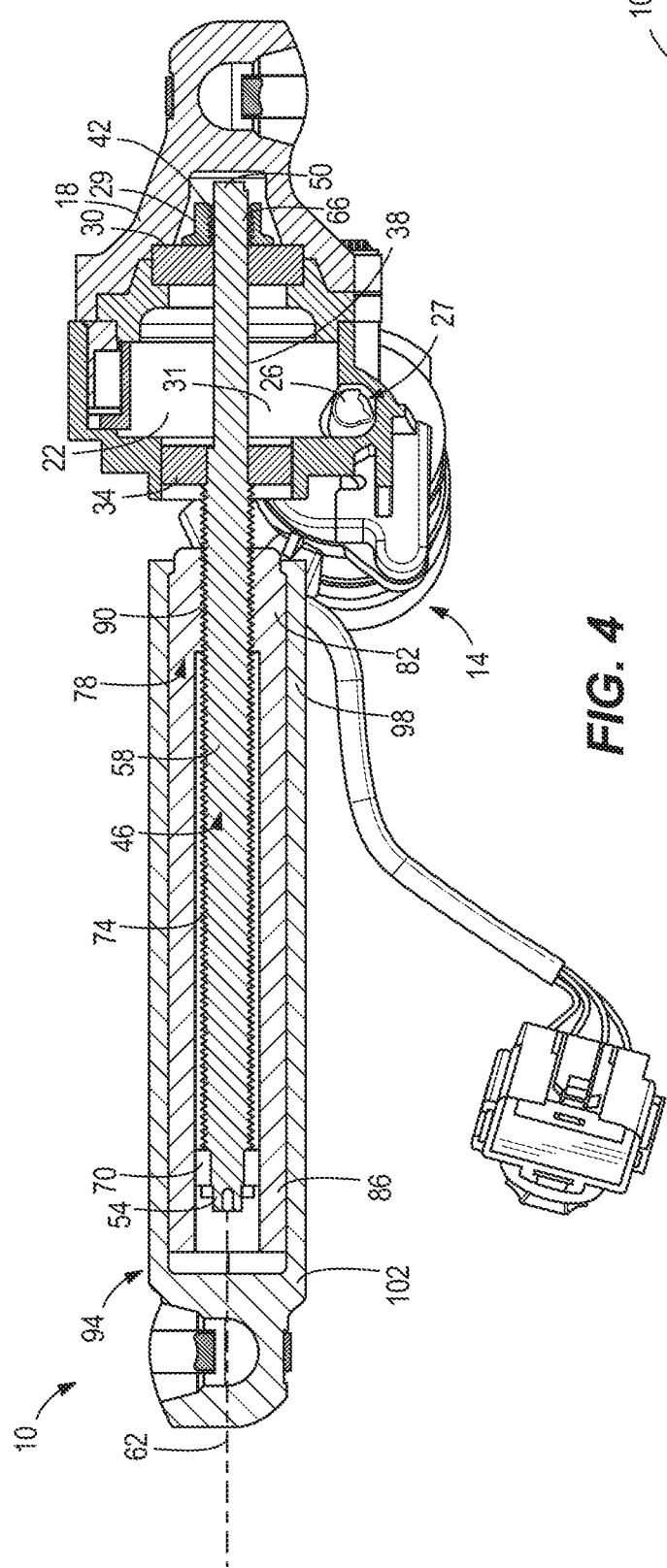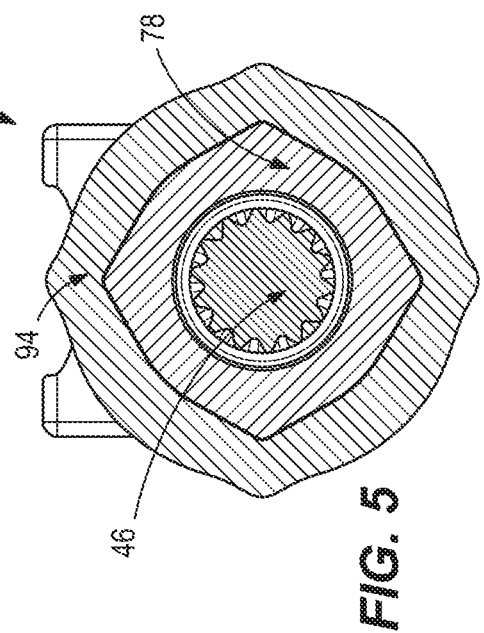

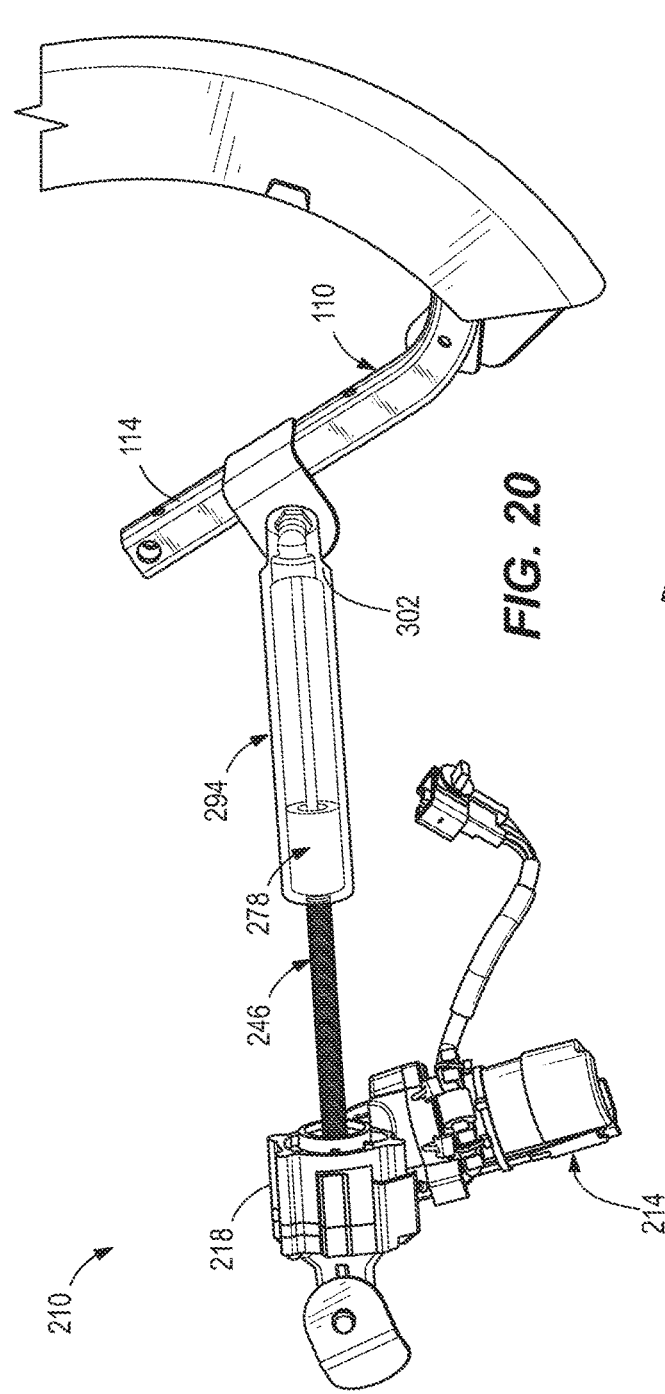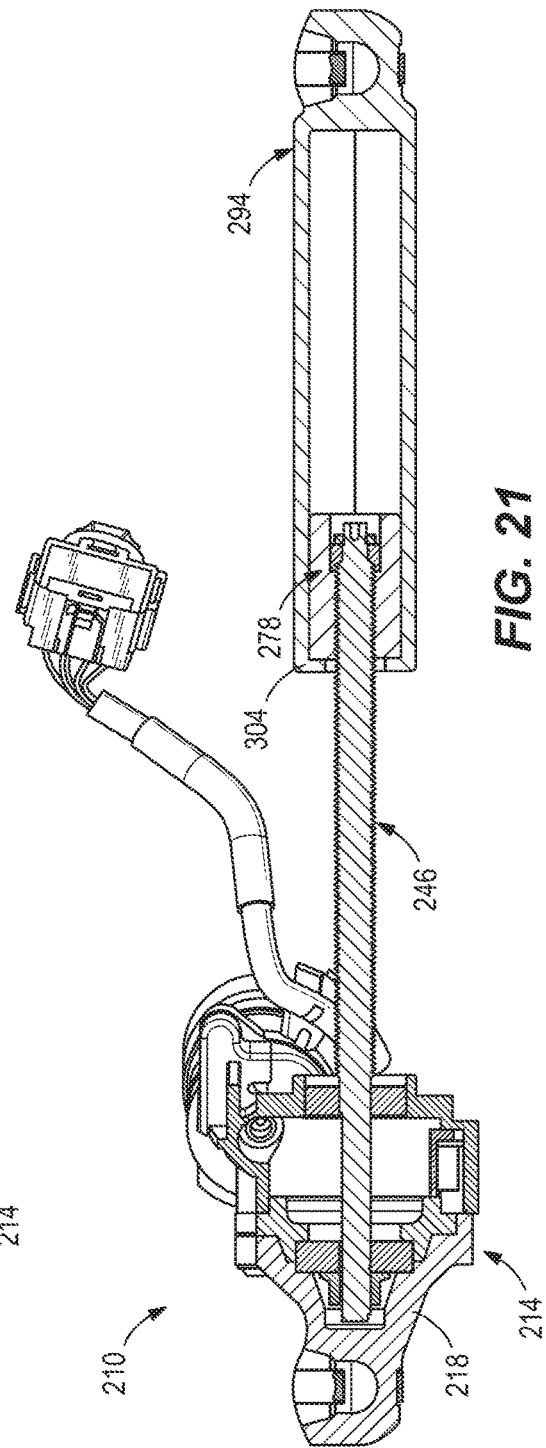

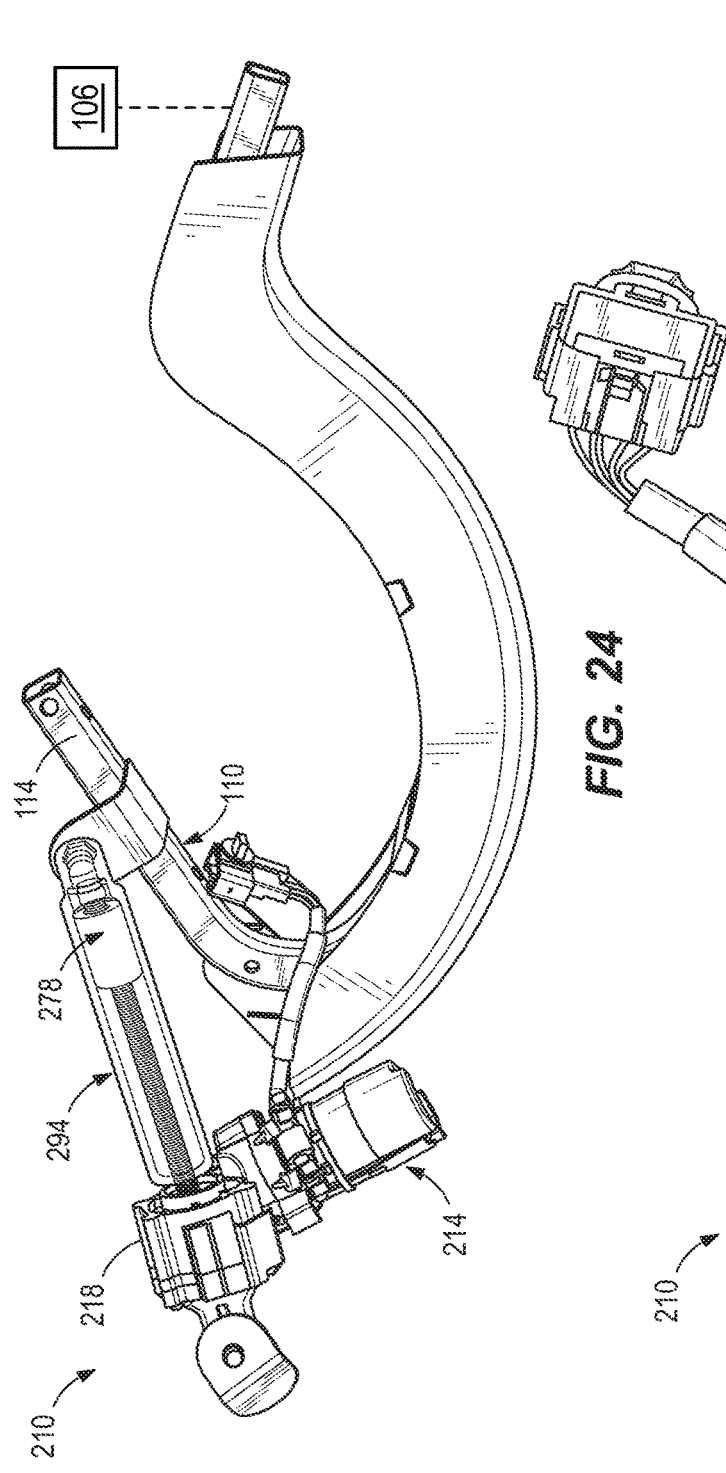
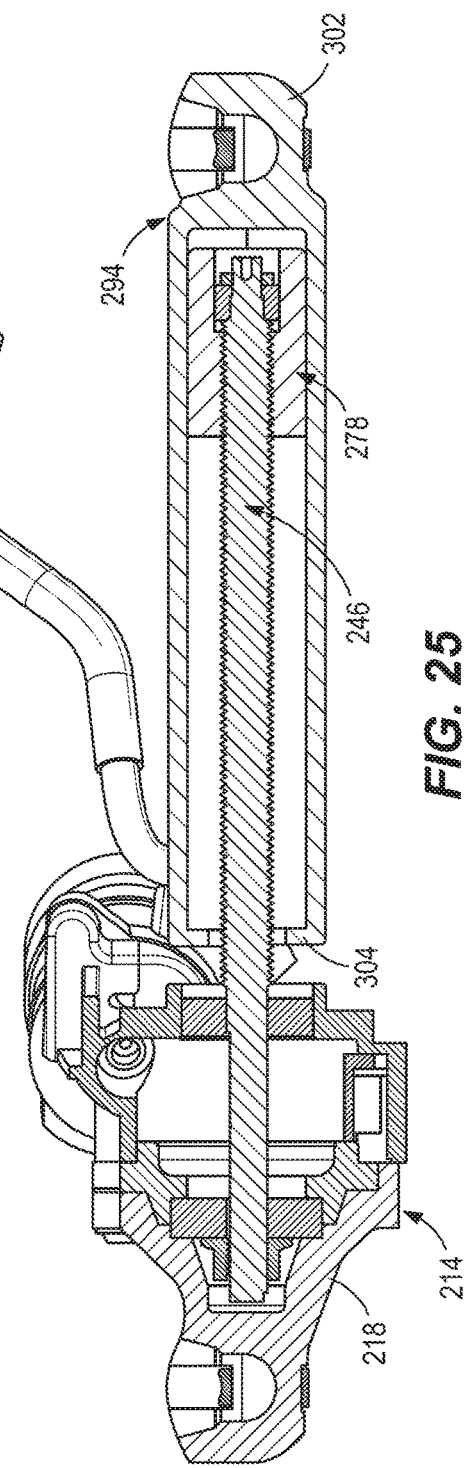

ACTUATOR FOR A VEHICLE CLOSURE AND METHOD OF ACTUATING A VEHICLE CLOSURE

CROSS-REFERENCE TO RELATED APPLICATIONS

This application claims priority to U.S. Provisional Application No. 62/334,765, filed May 11, 2016, the entire contents of which are incorporated herein by reference.

FIELD OF THE INVENTION

The present invention relates to actuators for decklids and other vehicle closures, and methods for actuating such structures.

BACKGROUND OF THE INVENTION

Motorized actuators are commonly used to open and/or close various vehicle closures such as decklids, sliding doors, liftgates, and the like. Despite advancements in such actuators and their application to vehicle closures, the user's ability to freely open and close the vehicle closure is often inhibited by the actuator itself in one or more states of the actuator. For example, many motor vehicles include a decklid along a rear of the vehicle that pivotally opens and closes to provide access to a trunk and/or storage compartment in the rear of the vehicle. Some decklids are powered opened and closed with a motor and geartrain. However, in many cases if the operator tries to manually move (e.g., open) the decklid, the operator will back-drive the motor and geartrain, thus creating a higher manual effort than would otherwise be required without the motor and geartrain. Similar issues exist in connection with actuators used to open and/or close other vehicle closures.

SUMMARY OF THE INVENTION

According to some embodiments, an actuator for opening and closing a decklid on a motor vehicle is provided, and includes a motor; a rod coupled to and driven by the motor; a first sleeve coupled to and driven by the rod; and a second sleeve coupled to and driven by the first sleeve; wherein the first and second sleeves are slidably coupled to one another.

Some embodiments provide an actuator for opening and closing a decklid on a motor vehicle, wherein the actuator includes a motor; a rod coupled to and driven by the motor; a first sleeve coupled to and driven by the rod; and a second sleeve coupled to and driven by the first sleeve; wherein the first and second sleeves are rotatably locked relative to one another.

In some embodiments, an actuator for opening and closing a decklid on a motor vehicle is provided, and includes a motor having a housing; a rod coupled to and driven by the motor; a first sleeve coupled to and driven by the actuator rod; a second sleeve coupled to and driven by the first sleeve; wherein the first and second sleeves are movable between a first state in which the first sleeve is positioned proximate the housing and the second sleeve is positioned away from the housing, a second state in which both the first and second sleeves are positioned proximate the housing, and a third state in which both the first and second sleeves are positioned away from the housing.

According to some embodiments, an actuator for opening and closing a decklid on a motor vehicle is provided, and includes a motor; a geartrain driven by the motor; a threaded rod coupled to and driven by the geartrain; a first sleeve coupled to and driven by the threaded rod, the first sleeve having threads that engage with threads on the threaded rod; and a second sleeve slidably coupled to the first sleeve.

Some embodiments provide an actuator for opening and closing a decklid on a motor vehicle, wherein the actuator includes a motor; a threaded rod having a first end driven by the motor and a second end that includes a stop; a first sleeve coupled to and driven by the threaded rod to translate between extended and retracted positions along a drive axis; and a second sleeve slidably coupled to the first sleeve along the drive axis; wherein the stop limits translational movement of the first sleeve.

In some embodiments, an actuator for opening and closing a decklid on a motor vehicle is provided, and includes a motor; and a telescoping assembly driven by the motor and comprising a rod; a first sleeve in which the rod is received; and a second sleeve in which the first sleeve is received, wherein the motor is coupled to the telescoping assembly and drives the telescoping assembly between states in which the rod, first sleeve, and second sleeve are in different translational positions with respect to one another along a drive axis.

Other features and aspects of the invention will become apparent by consideration of the following detailed description and accompanying drawings.

BRIEF DESCRIPTION OF THE DRAWINGS

FIGS. 4 and 5 are cross-sectional views of the actuator of FIG. 1.

FIGS. 20-25 are perspective and cross sectional views of the actuator of FIG. 18, showing a manual opening and powered closing of the decklid.

Figure 1:
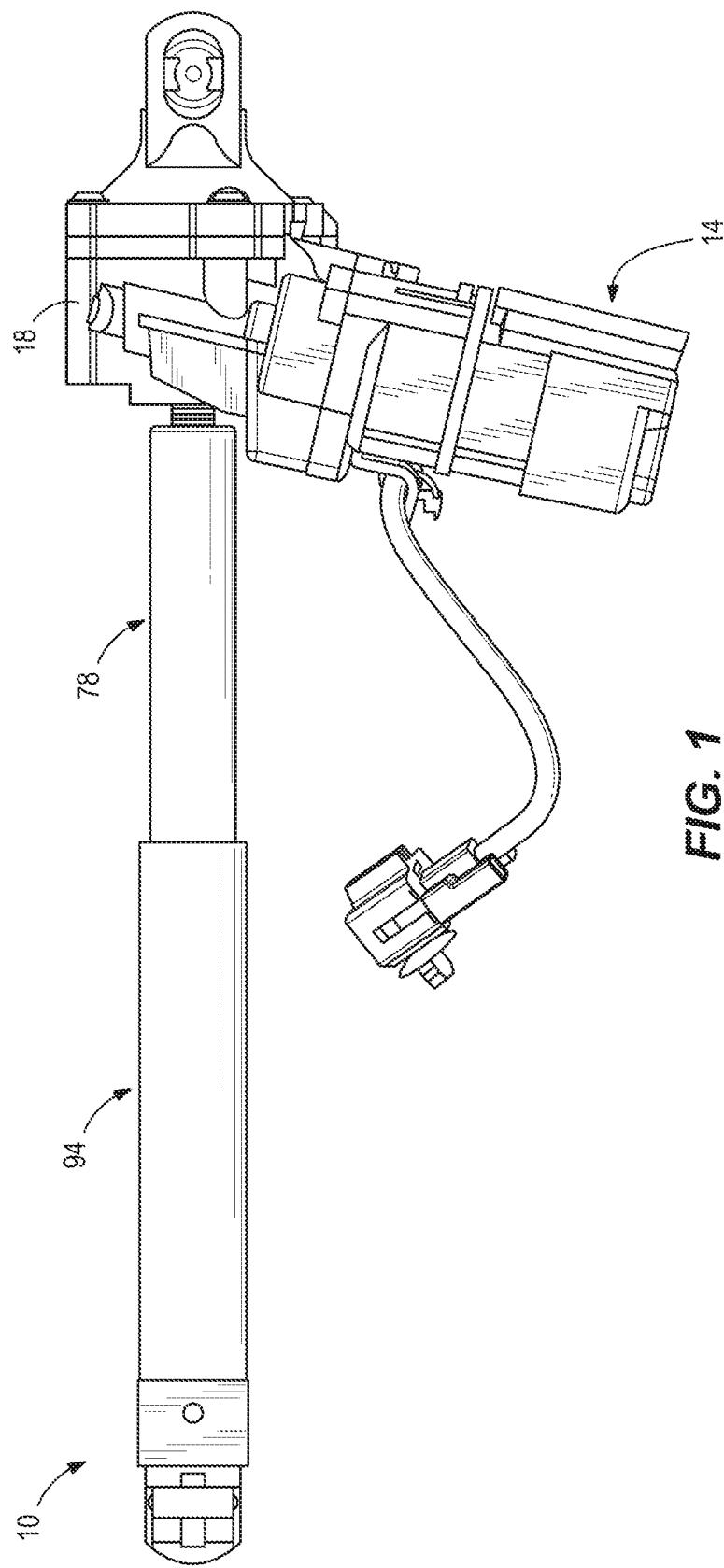
FIG. 1 is a side view of an actuator according to one construction, shown in a first state.

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-5 illustrate an actuator 10 for opening and closing a decklid on a motor vehicle. The actuator 10 includes a motor 14 having a housing 18. As illustrated in FIG. 4, the housing 18 includes an inner chamber 22. In some embodiments, the housing 18 also at least partially encloses a motor drive mechanism 26 (e.g., a geartrain), and can also house at least one bearing, such as a first bearing 30 and a second bearing 34 in the illustrated embodiment. The first and second bearings 30, 34 are separated from one another by a gap 38. With continued reference to the illustrated embodiment, the motor drive mechanism 26 is disposed between the first and second bearings 30, 34. In the illustrated construction, the motor drive mechanism 26 includes a worm gear 27 having external threads meshing with a gear 31 secured on a rod 46 (described below) in any suitable manner, such as by being keyed to the rod 46, by being threaded onto the rod 46, by mounting via a splined or interference fit, and the like. In this manner, the motor 14 can be driven to drive the gears 27, 31 and to thereby turn the rod 46. It will be appreciated that in other embodiments, different motor drive mechanisms 26 can be used as desired. For example, in some constructions the motor drive mechanism 26 includes other powertrain elements for transmitting mechanical motion from the motor 14 to the rod 46, such as one or more gears drivably meshing with gear teeth formed or otherwise defined on the rod 46 or on any other type of gear secured to the rod 46 in any conventional manner (e.g., keyed, an interference fit, a splined connection, and the like), a coupling directly connecting an output shaft of the motor to the rod 46 (e.g., an in-line coupling), and the like. In some constructions only a single bearing 30, 34 is provided to rotatably support the rod 46, or more than two bearings 30, 34 are used. In some constructions the bearings 30, 34, and/or the motor drive mechanism 26 are disposed at different locations than that illustrated, or are different sizes or shapes than that illustrated.

With continued reference to FIG. 4, the illustrated actuator 10 further includes a rod 46 having a first end 50, a second end 54, and a central region 58 disposed between the first end 50 and the second end 54. In some embodiments, an internally-threaded nut 29 can be threaded upon threads at or proximate the first end 50 of the rod 46 in order to secure the bearing(s) 30, 34, and gear 31 in place on the rod 46. In the illustrated construction the rod 46 is a single member that extends along a drive axis 62, although the rod 46 can be defined by two or more elements that extend in such a manner along the drive axis 62. The second end 54 of the illustrated rod 46 includes a stop member 70 that projects radially away from the drive axis 62, and the central region 58 includes a series of external threads 74 extending along at least a portion of a length (as measured along the drive axis 62) of the rod 46. As illustrated in FIG. 4, in some embodiments the rod 46 includes no threads between the central region 58 and the first end 50. Rather, the bearings 30, 34 engage and support the rod 46 in this region, allowing the rod 46 to smoothly rotate within the bearings 30, 34. The rod 46 rotates about the drive axis 62, but does not move linearly along the drive axis 62. For example, in the illustrated embodiment, the nut 29 on the first end 50 of the rod 46 prevents the rod 46 from moving linearly along the drive axis 62. In other embodiments, the first end 50 (or either or both bearings 30, 34 and/or the gear 31) includes a projection or other structure that prevents the rod 46 from moving linearly along the drive axis 62. Other constructions include different arrangements than that illustrated. For example, in some constructions the rod 46 includes one or more regions having internal threads, as opposed to external threads. In some constructions the external threads 74 extend along a length of the rod 46 that is different from that shown. In some constructions the stop member 70 has a different shape or structure than that illustrated. While the illustrated rod 46 has generally a cylindrical, rod-like shape, in other constructions the rod 46 has other shapes, diameters, and/or sizes than that illustrated.

With reference to FIGS. 4 and 5, the actuator 10 further includes a first sleeve 78 that is coupled to and driven by the rod 46. In the illustrated construction, the first sleeve 78 is a hollow tube having a first end 82 and a second end 86 spaced from the first end 82 along the drive axis 62. As illustrated in FIG. 4, the first end 82 includes internal threads 90 that engage with the external threads 74 of the rod 46, such that when the rod 46 is rotated by the motor drive mechanism 26, the first sleeve 78 is moved linearly along the drive axis 62 (e.g., either to the left or right as viewed in FIG. 4). In some embodiments, such as the illustrated embodiment, the first end 82 has an internal diameter or opening that is smaller than an internal diameter or opening of the second end 86, and that is also smaller than a diameter of the stop member 70, such that when the first sleeve 78 is moved along the drive axis 62 away from the housing 18 (i.e., to the left in FIG. 4), the stop member 78 prevents the first sleeve 78 from unthreading from the second end 86 of the rod 46 by contacting the first end 82 of the first sleeve 78 as needed. In some constructions, when the first sleeve 78 is moved along the drive axis 62 toward the housing 18 (i.e., to the right in FIG. 4), the first end 82 of the first sleeve 78 also contacts the second bearing 34 and is prevented from moving farther along the drive axis 62 in the same direction. Thus, the first sleeve 78 has a limited range of motion along the drive axis 62.

With continued reference to FIGS. 4 and 5, the actuator 10 further includes a second sleeve 94 that is coupled to the first sleeve 78. In the illustrated construction, the second sleeve 94 is a hollow, unthreaded tube having a first end 98 and a second end 102 spaced from the first end 98 along the drive axis 62. As illustrated in FIG. 4, the second sleeve 94 is shaped to permit the second sleeve 94 to move along the drive axis 62 in a telescoping manner with respect to the first sleeve 78 and with respect to the rod 46 (e.g., to extended and retracted positions with respect to the housing 18). In this regard, the second sleeve 94 fits over the first sleeve 78 and in some embodiments can be held to the first sleeve 78 with a frictional fit. The fit between the first and second sleeves 78, 94 is loose enough such that the second sleeve 94 may be pushed and pulled along the first sleeve 78 with ease by the force of an operator lifting up on a decklid with his or her hand.

With reference to the illustrated embodiment of FIG. 5 by way of example only, the first sleeve 78 and the second sleeve 94 can have geometric cross-sectional shapes along at least a portion of each of the first sleeves 78 and the second sleeves 94 that rotationally lock the first sleeve 78 to the second sleeve 94. For example, in the illustrated construction, the first sleeve 78 and the second sleeve 94 each have a non-circular cross-sectional shape (e.g., generally diamond-shaped with arched sides as seen in FIG. 5). Other constructions include different geometric cross-sectional shapes than that illustrated. When the motor drive mechanism 26 is rotated, the external threads 74 of the rod 46 engage the internal threads 90 of the first sleeve 78, causing the first sleeve 78 to slide linearly along the drive axis 62. When the first sleeve 78 slides, the second sleeve 94 also slides, due to pressing of the second end 86 of the first sleeve 78 against the second end 102 of the second sleeve 94.

Figure 2:
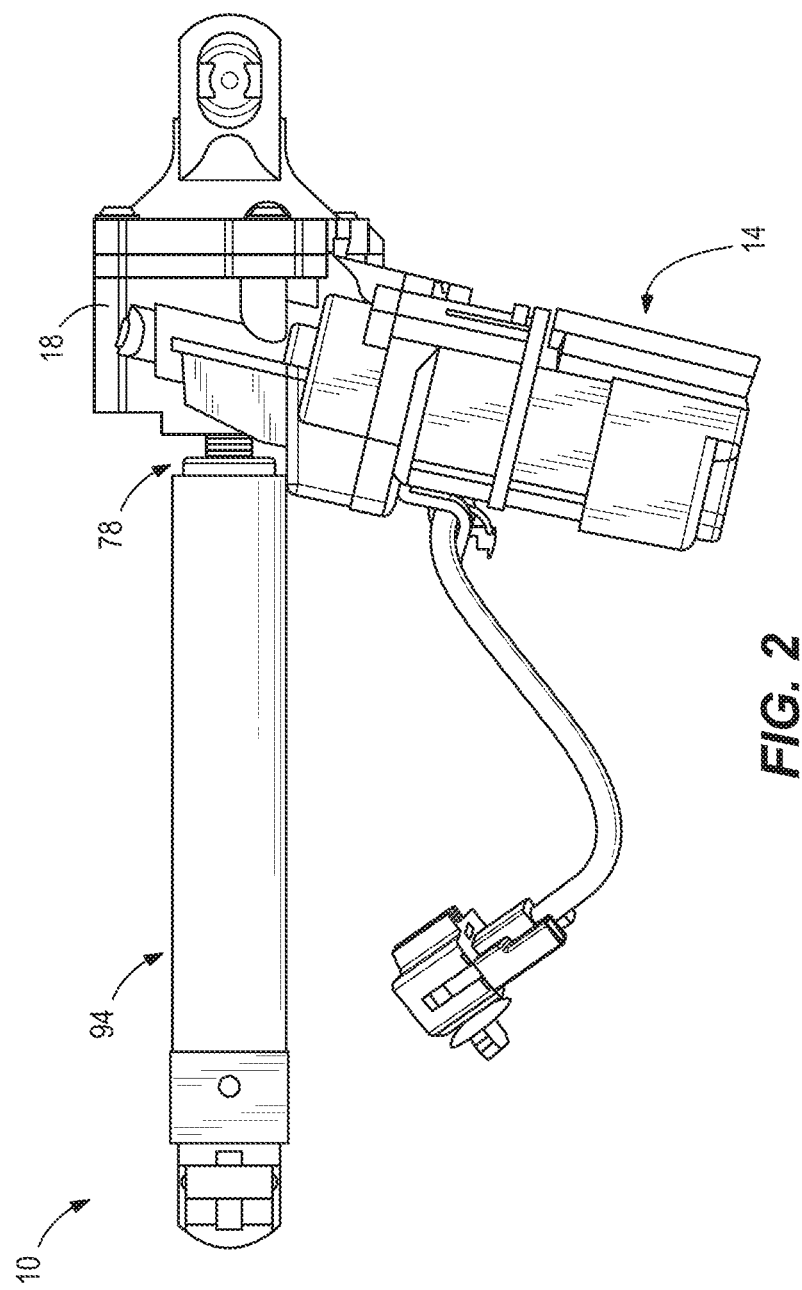
FIG. 2 is a side view of the actuator of FIG. 1, shown in a second state.
Figure 3:
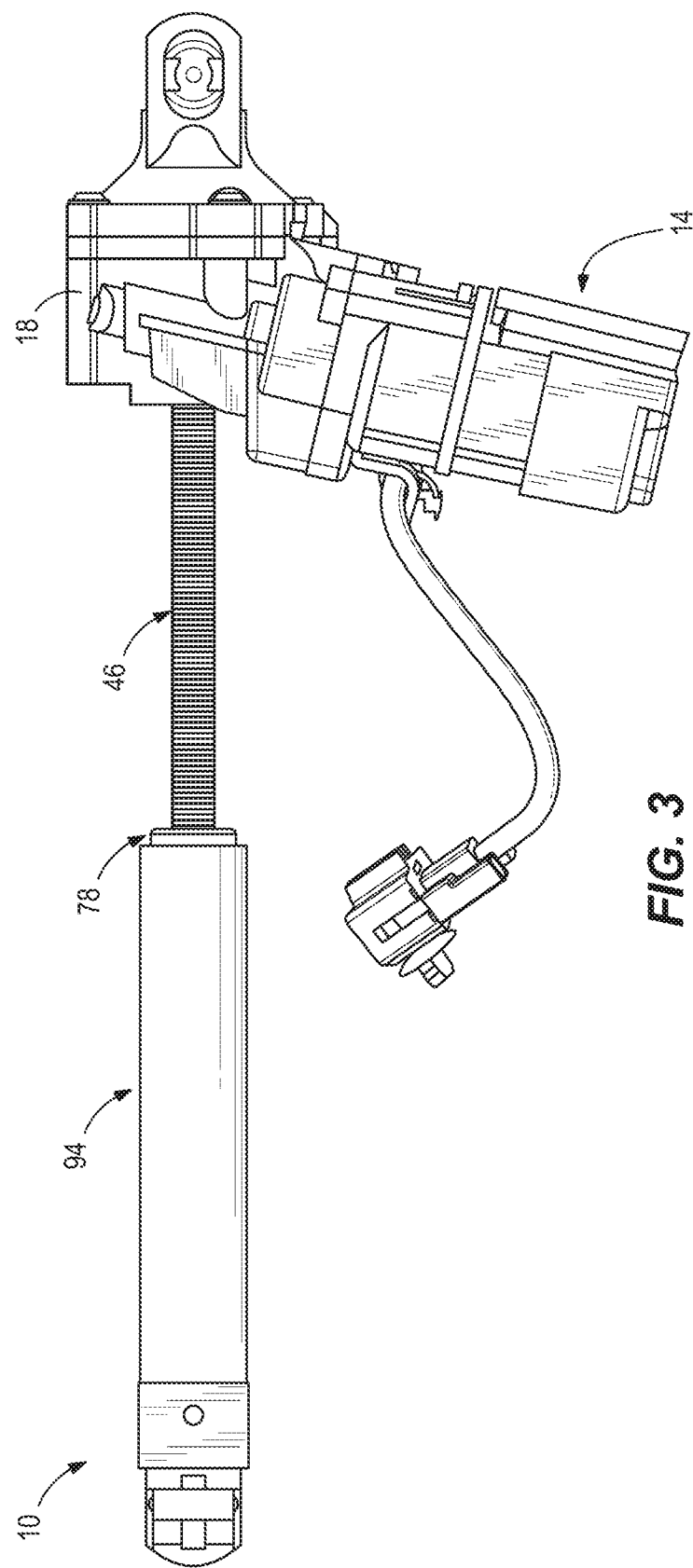
FIG. 3 is a side view of the actuator of FIG. 1, shown in a third state.

With reference to FIGS. 1-3, the actuator 10 may be used to move the first and second sleeves 78, 94 to various positions. For example, as illustrated in FIG. 1, the first and second sleeves 78, 94 may be moved to a first state, in which the first sleeve 78 is in close proximity to the housing 18, but where the second sleeve 94 is positioned distally away from the housing 18. As illustrated in FIG. 2, the first and second sleeves 78, 94 may be moved to a second state, in which both the first and second sleeves 78, 94 are positioned in close proximity to the housing 18. As illustrated in FIG. 3, the first and second sleeves 78, 94 may be moved to a third state, in which both the first and second sleeves 78, 94 are positioned distally away from the housing 18.

Figure 6:
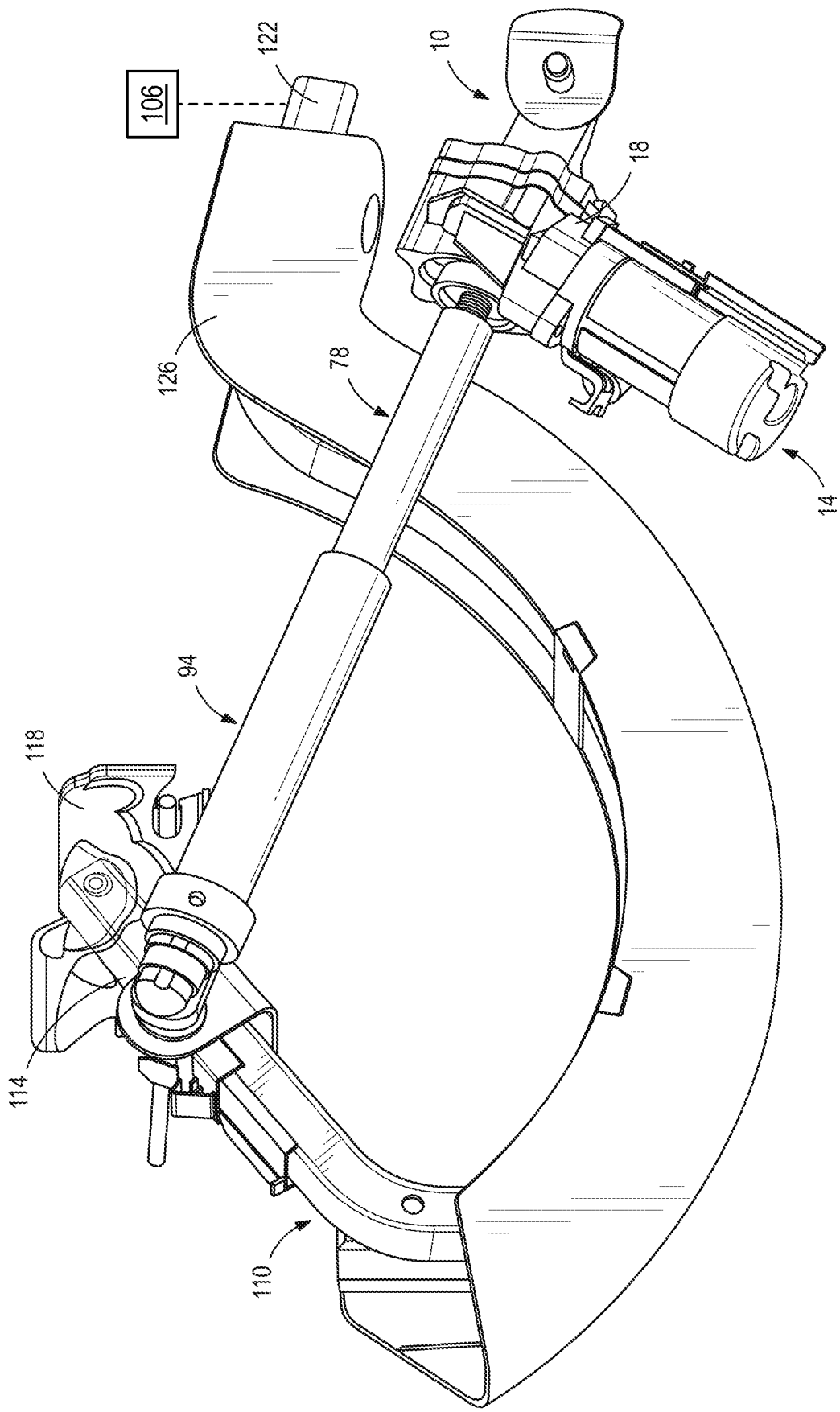
FIGS. 6-10 are perspective views of the actuator of FIG. 1, showing a manual opening and manual closing of a decklid.

FIGS. 6-10 illustrate use of the actuator 10 to manually open and close a decklid 106 (illustrated schematically in FIG. 6). As illustrated in FIGS. 6-10, the actuator 10 is coupled to a decklid arm 110. In the illustrated construction, the decklid arm 110 is a curved, rigid arm having a first end 114 that is pivotally coupled to a bracket 118. The bracket 118 may be fixed, for example, to the inside of a trunk of a motor vehicle (e.g., to a frame element or other suitable member), or to another area of a motor vehicle. The motor 14 may also be fixed, for example, to the inside of the trunk of the motor vehicle, or to another area of the motor vehicle. The decklid arm 110 further includes a second end 122, which may be coupled for example to the decklid 106 (e.g., to a ball stud on a decklid hinge of the decklid 106). A decklid arm casing 126 extends over at least a portion of the decklid arm 110, and provides added stability and protection to the decklid arm 110. The decklid arm 110 is coupled (e.g., pivotally coupled) to the second sleeve 94, and moves linearly with the second sleeve 94.

As illustrated in FIG. 6 (and FIG. 1), the first and second sleeves 78, 94 are initially in a first position. In this position, the second end 122 of the decklid arm 110 is at its lowest point, and the decklid 106 is closed. In some constructions, to open the decklid 106, a key or key fob is used to initially release the decklid 106 (e.g., including release of a latch from a striker). Once the decklid 106 is unlatched, the operator may then lift up on the decklid 106.

Figure 7:
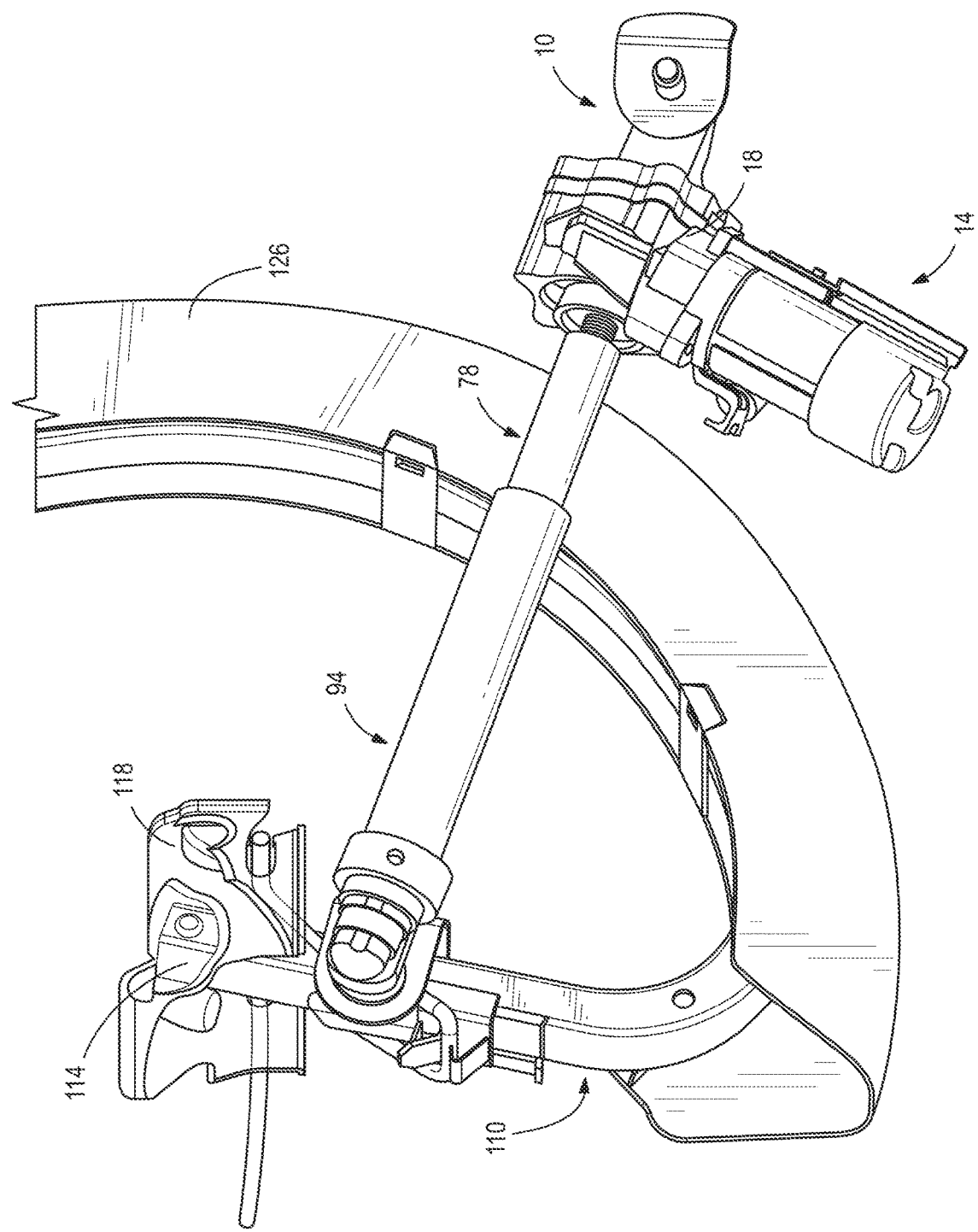
Figure 8:
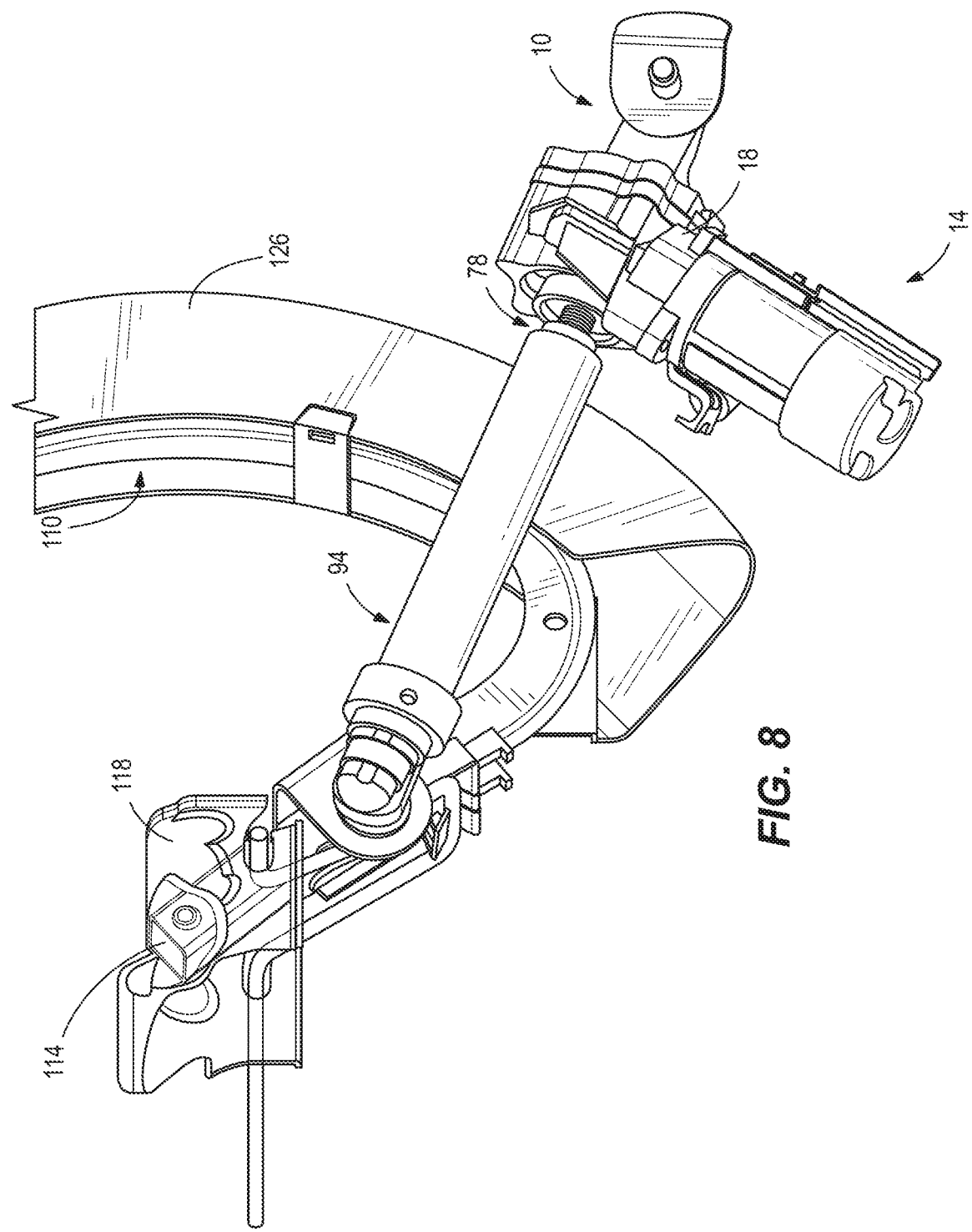

With reference to FIGS. 7 and 8, when lifting up on the decklid 106 (in some embodiments, with the assistance of one or more springs or other biasing elements urging the decklid 106 to an open position), the decklid arm 110 pivots within the bracket 118, and the second sleeve 94 begins to slide over the first sleeve 78 toward the housing 18. As described above, in some constructions there is no connection between the second sleeve 94 and the first sleeve 78 other than, for example, a loose frictional fit, such that the second sleeve 94 may easily and smoothly be moved over the first sleeve 78 and the operator may open the decklid 106 without back-driving the motor 14 (which does not operate at all in FIGS. 6-10). With reference to FIG. 8 (and FIG. 2), when the first and second sleeves 78, 94 are in the second position, the decklid 106 is fully open.

Figure 9:
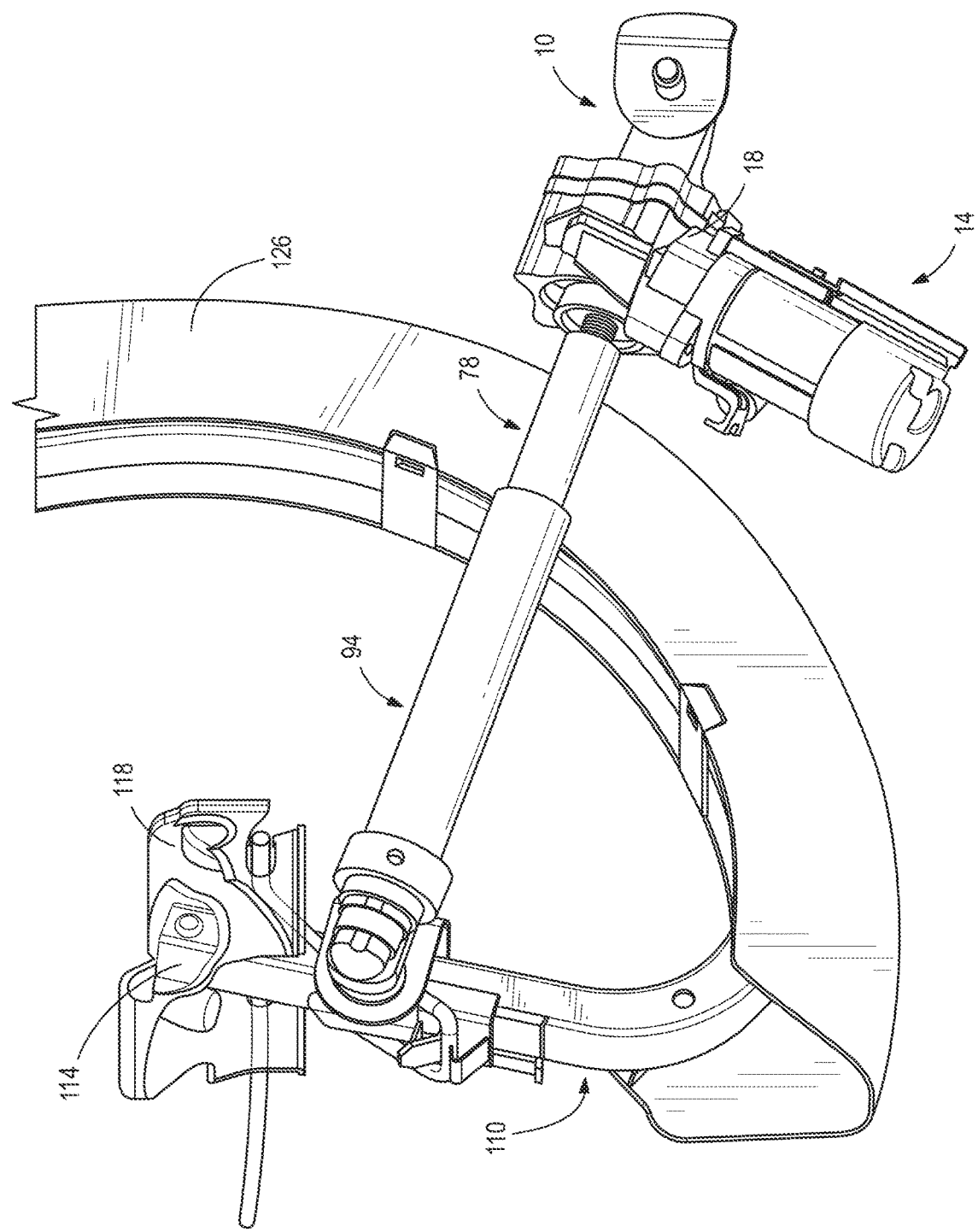
Figure 10:
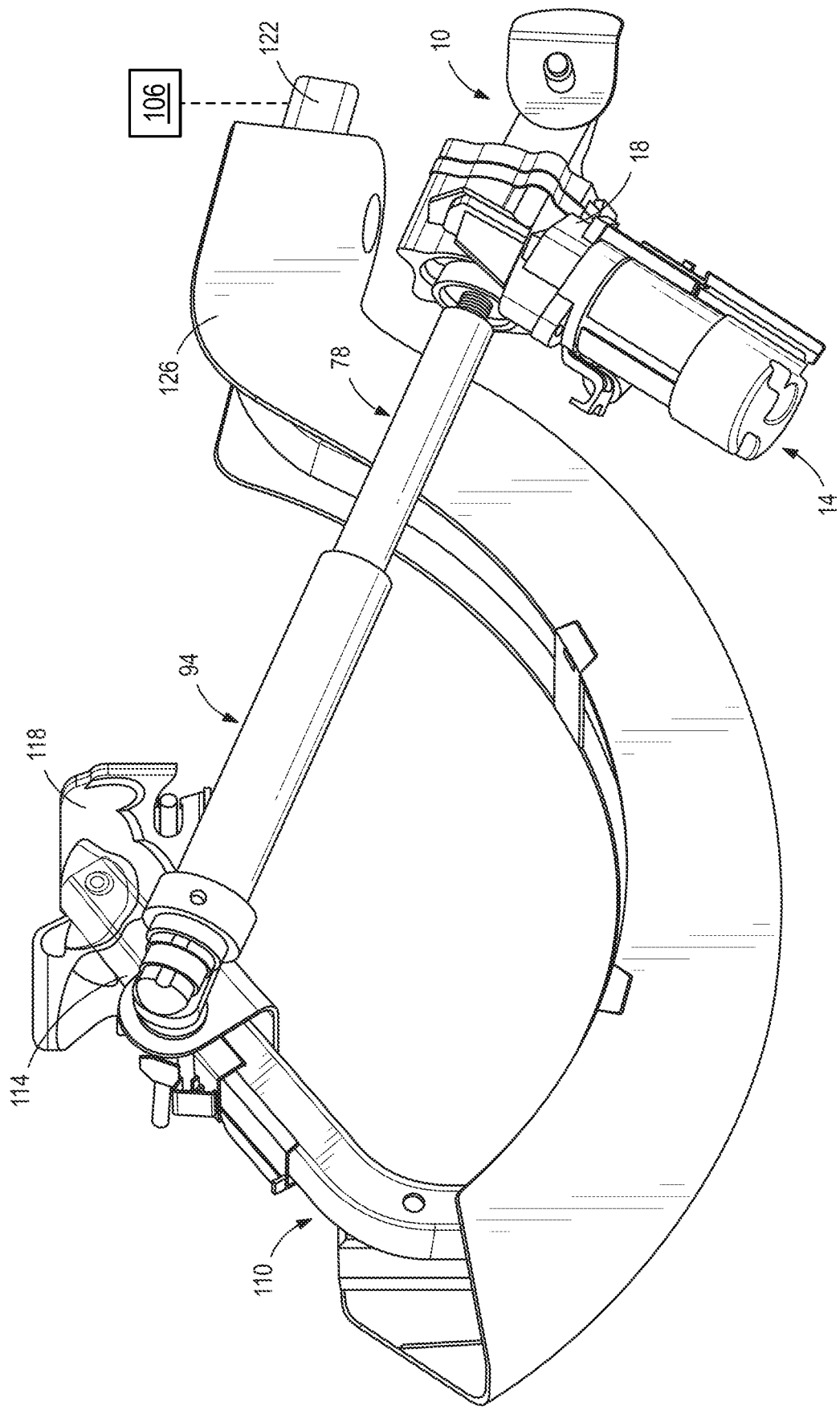

With reference to FIGS. 9 and 10, once the operator is ready to close the decklid 106, the operator presses down on the decklid 106, causing the decklid arm 110 to pivot in the opposite direction, and the first and second sleeves 78, 94 to move back to the first position. In some constructions, this movement causes a latch and striker to engage, thereby securing the decklid 106 in a shut position.

Figure 11:
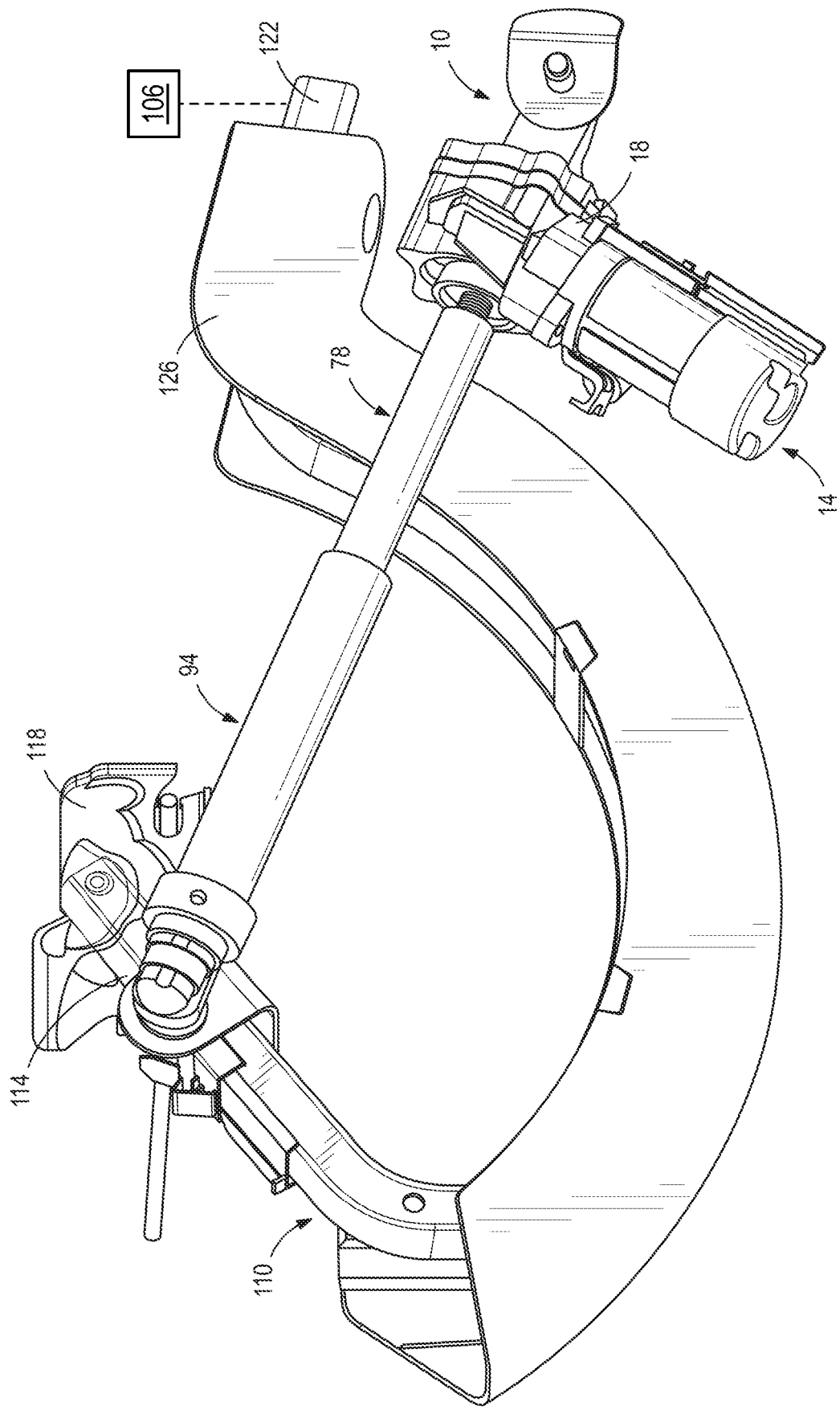
FIGS. 11-17 are perspective views of the actuator of FIG. 1, showing a manual opening and powered closing of the decklid.

FIGS. 11-17 illustrate use of the actuator 10 to manually open the decklid 106, and to power the decklid 106 closed. As illustrated in FIG. 11 (and FIG. 1), the first and second sleeves 78, 94 are initially in the first position. In this position, the second end 122 of the decklid arm 110 is at its lowest point, and the decklid 106 is closed. In some constructions, to open the decklid 106, a key or key fob is used to initially release the decklid 106 (e.g., including release of a latch from a striker). Once the decklid 106 is unlocked, the operator may lift up on the decklid 106.

Figure 12:
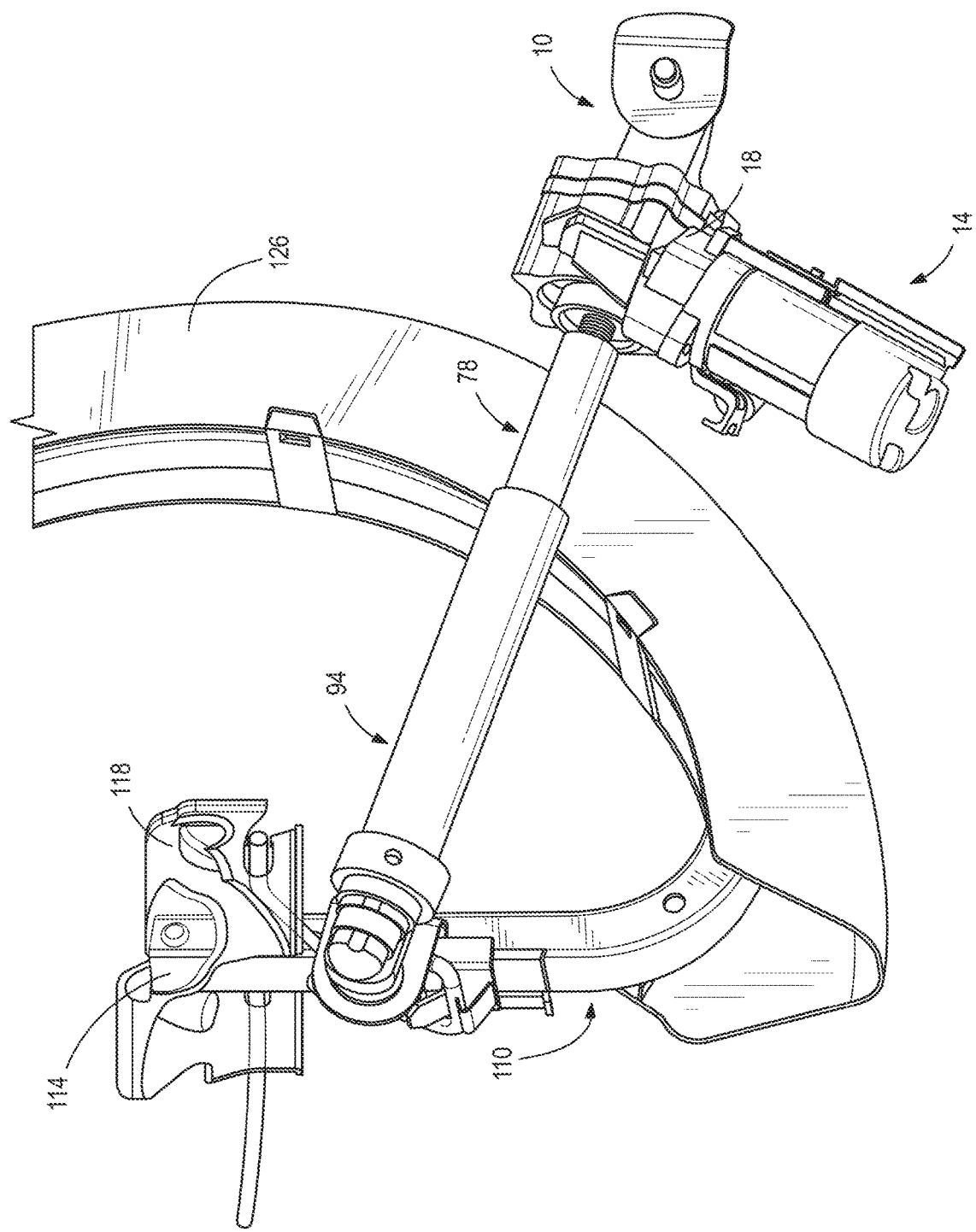
Figure 13:
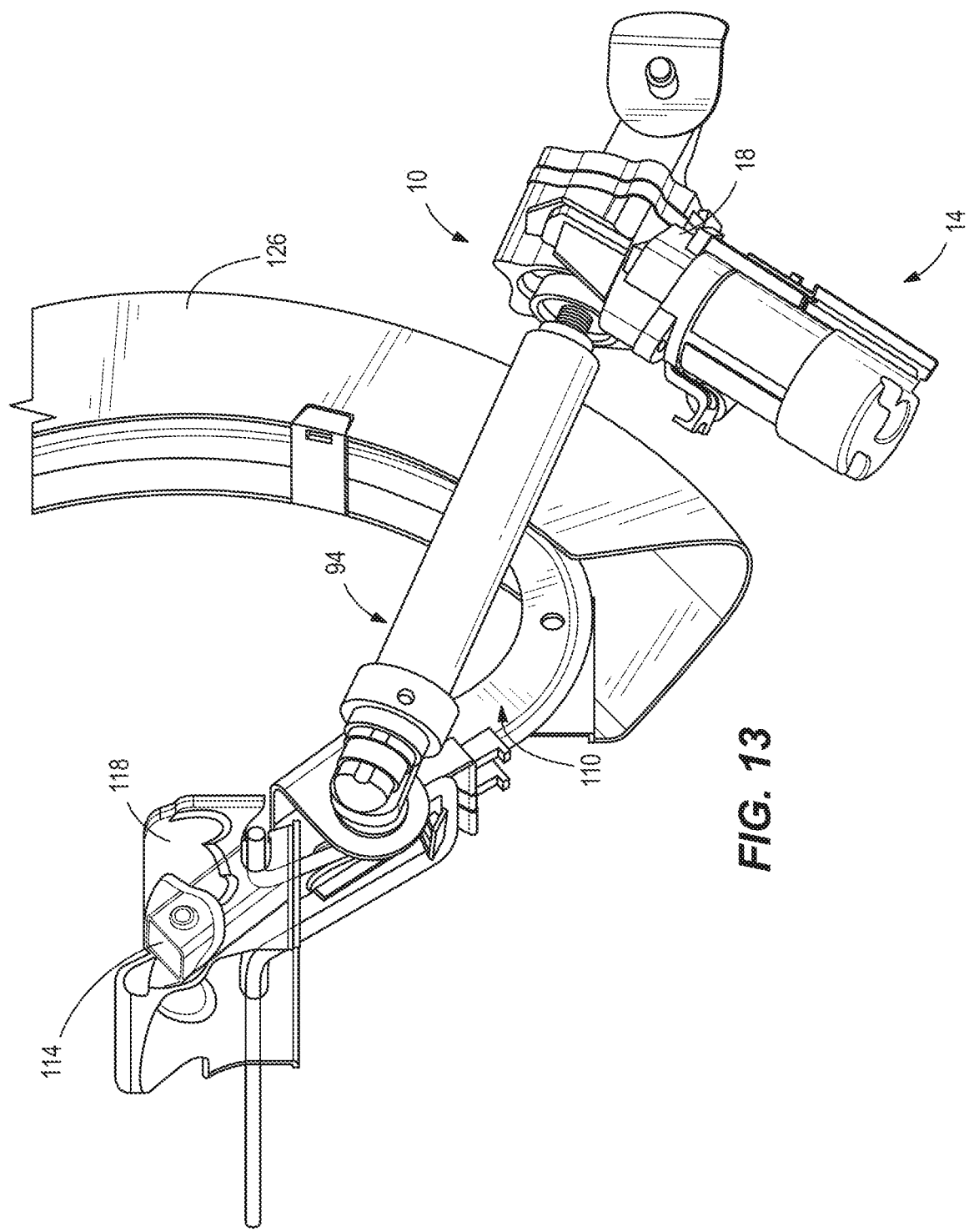

With reference to FIGS. 12 and 13, when lifting up on the decklid 106 (in some embodiments, with the assistance of one or more springs or other biasing elements urging the decklid 106 to an open position), the decklid arm 110 pivots within the bracket 118, and the second sleeve 94 begins to slide over the first sleeve 78 toward the housing 18. As described above, the second sleeve 94 may easily and smoothly be moved over the first sleeve 78, and the operator may open the decklid 106 without back-driving the motor 14. With reference to FIG. 13 (and FIG. 2), when the first and second sleeves 78, 94 are in the second position, the decklid 106 is fully open.

Figure 14:
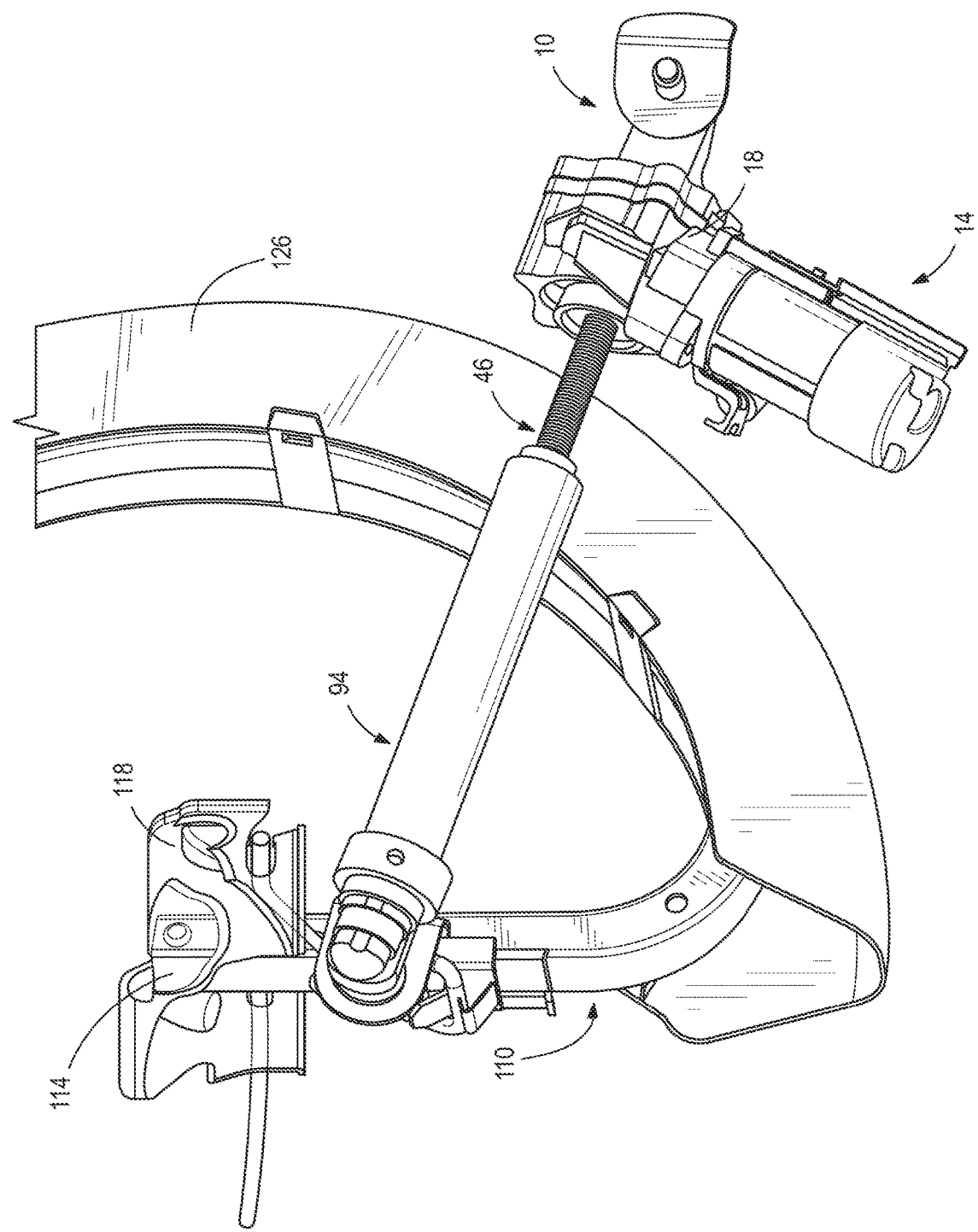
Figure 15:
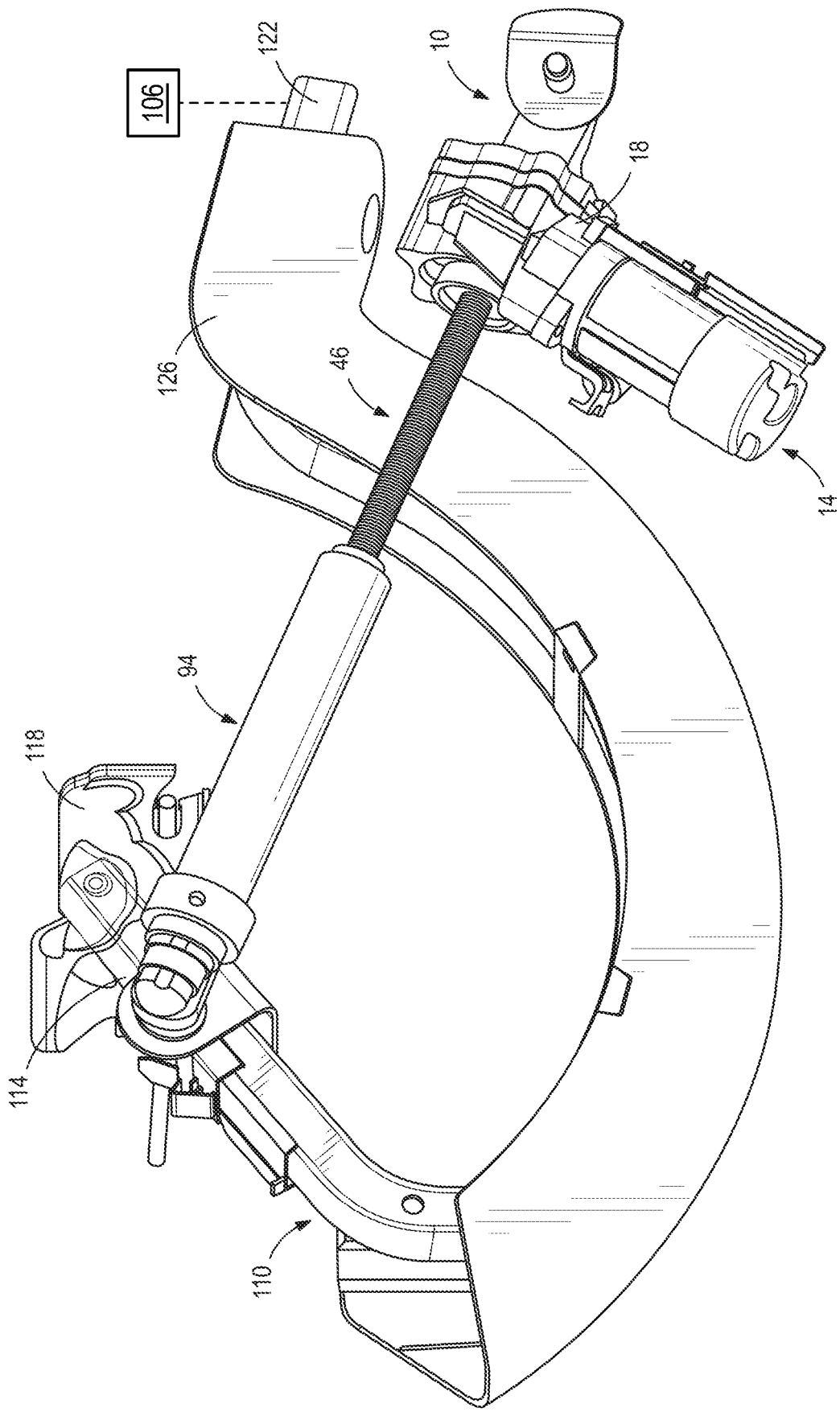

With reference to FIGS. 14 and 15, to close the decklid 106, the motor 14 is activated (e.g., via a key fob or other remote device). When the motor 14 is activated, the worm gear 31 is driven by the motor 14, and in turn drives the gear 31 fitted on the rod 46, causing the rod 46 to rotate. Rotation of the rod 46 causes the external threads 74 of the rod 46 to engage the internal threads 90 of the first sleeve 78 and to move the first sleeve 78 linearly along the drive axis 62 away from the housing 18. Movement of the first sleeve 78 axially causes the second end 86 of the first sleeve 78 to contact the second end 102 of the second sleeve 94, thereby pushing and sliding the second sleeve 94 with the first sleeve 78, until the first end 82 of the first sleeve 78 contacts the stop member 70, or until the first and second sleeves 78, 94 are stopped in any other manner (e.g., by one or more sensors detecting the positions of the first and second sleeves 78, 94, or by detecting the number of rotations of the motor 14, or in any other suitable manner). At this point, the first and second sleeves 78, 94 are in the third position shown in FIG. 15 (and FIG. 3). In some constructions, this movement causes a latch and striker to engage, thereby securing the decklid 106 in a shut position.

Figure 16:
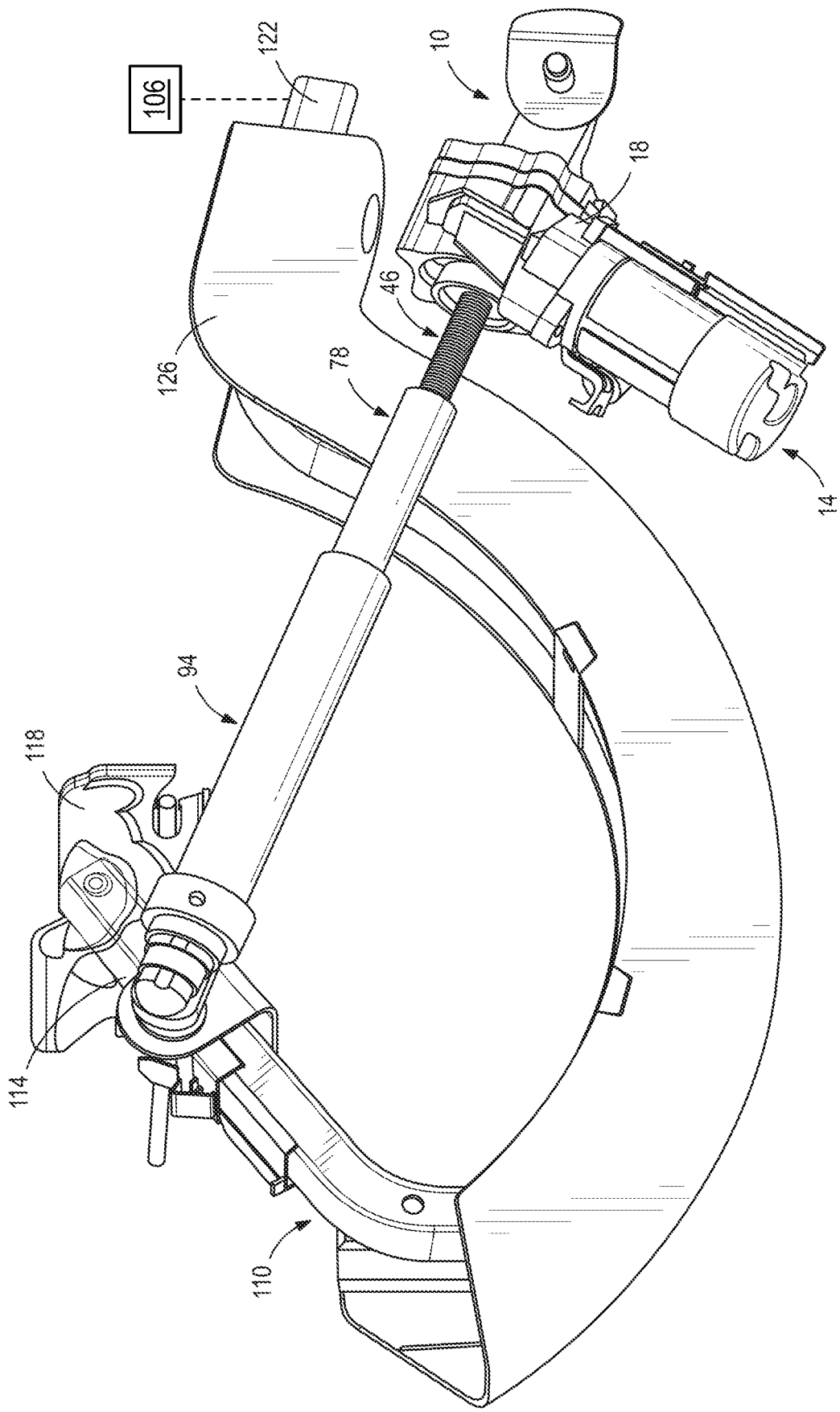
Figure 17:
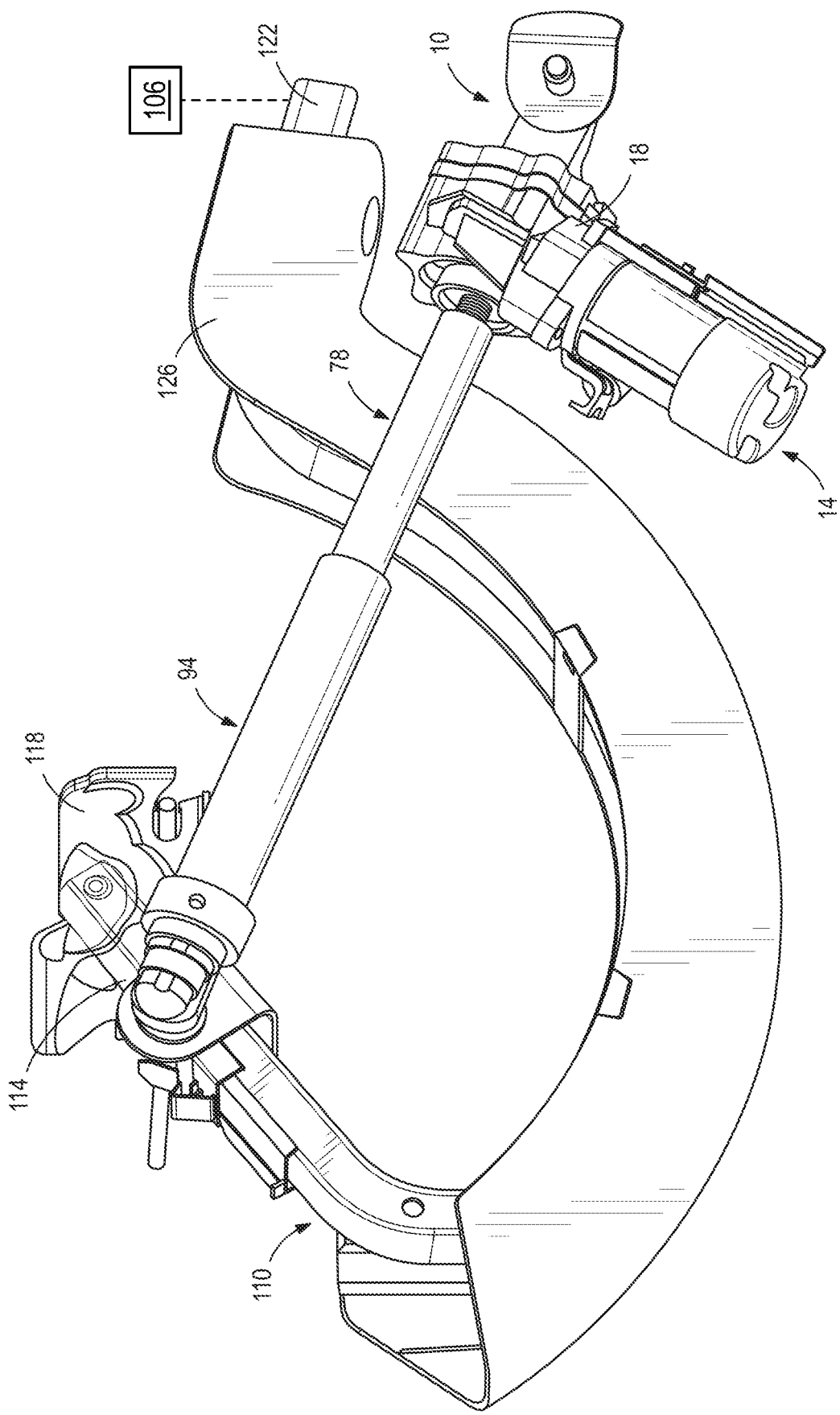

With reference to FIGS. 16 and 17, the motor 14 can then be reversed, causing the motor drive mechanism 26 to rotate in an opposite direction, and causing the rod 46 to rotate in an opposite direction, thereby pulling the first sleeve 78 back toward the housing 18. As illustrated in FIGS. 16 and 17, as the first sleeve 78 is pulled back toward the housing 18, the second sleeve 94 remains stationary. As described above, the second sleeve 94 may easily and smoothly be moved over the first sleeve 78, such that when the first sleeve 78 is moved back toward the housing 18, the first sleeve 78 slides relative to the second sleeve 94 until the first and second sleeves 78, 94 are again back in the first position as shown in FIG. 17 (and FIG. 1).

Although the actuator 10 illustrated in the accompanying figures is positioned and mounted to facilitate retracting the actuator 10 to open the decklid, and extending the actuator 10 to close the decklid, it will be appreciated that the opposite result can be achieved in any decklid or other vehicle closure application simply by changing the locations at which the actuator 10 is mounted to the decklid or other vehicle closure and the vehicle.

It will be appreciated that the telescoping extension and retraction motion of the first and second sleeves 78, 94 and the rod 46 can be achieved with other elements in a similar fashion. For example, rather than rotate an externally-threaded rod 46 to extend and retract the first sleeve 78, the motor drive mechanism 26 can be adapted to rotate an internally-threaded tube (not shown) that remains in a set position along the drive axis 62, in which case the threads of the tube can extend and retract an internally-threaded tube (e.g., a tube otherwise similar to first sleeve 78) carrying a third tube (e.g., a tube otherwise similar to the second sleeve 94) in a sliding manner as described above. Like the embodiment of FIGS. 1-17 described above and the embodiments of FIGS. 18-25 described below, such an actuator has a motor driving a first elongated threaded element that is threadably engaged with threads on a second elongated element, which itself is slidable with respect to a third elongated element that can move to different axial positions along the second elongated element (and the drive axis of the actuator). With this arrangement of elements, the functionality described above of permitting manual opening and closing of a decklid or other vehicle closure is still achieved (without the need to backdrive the motor 14) while also providing the powered closure opening and closing capabilities described herein.

Figures 18, 19:
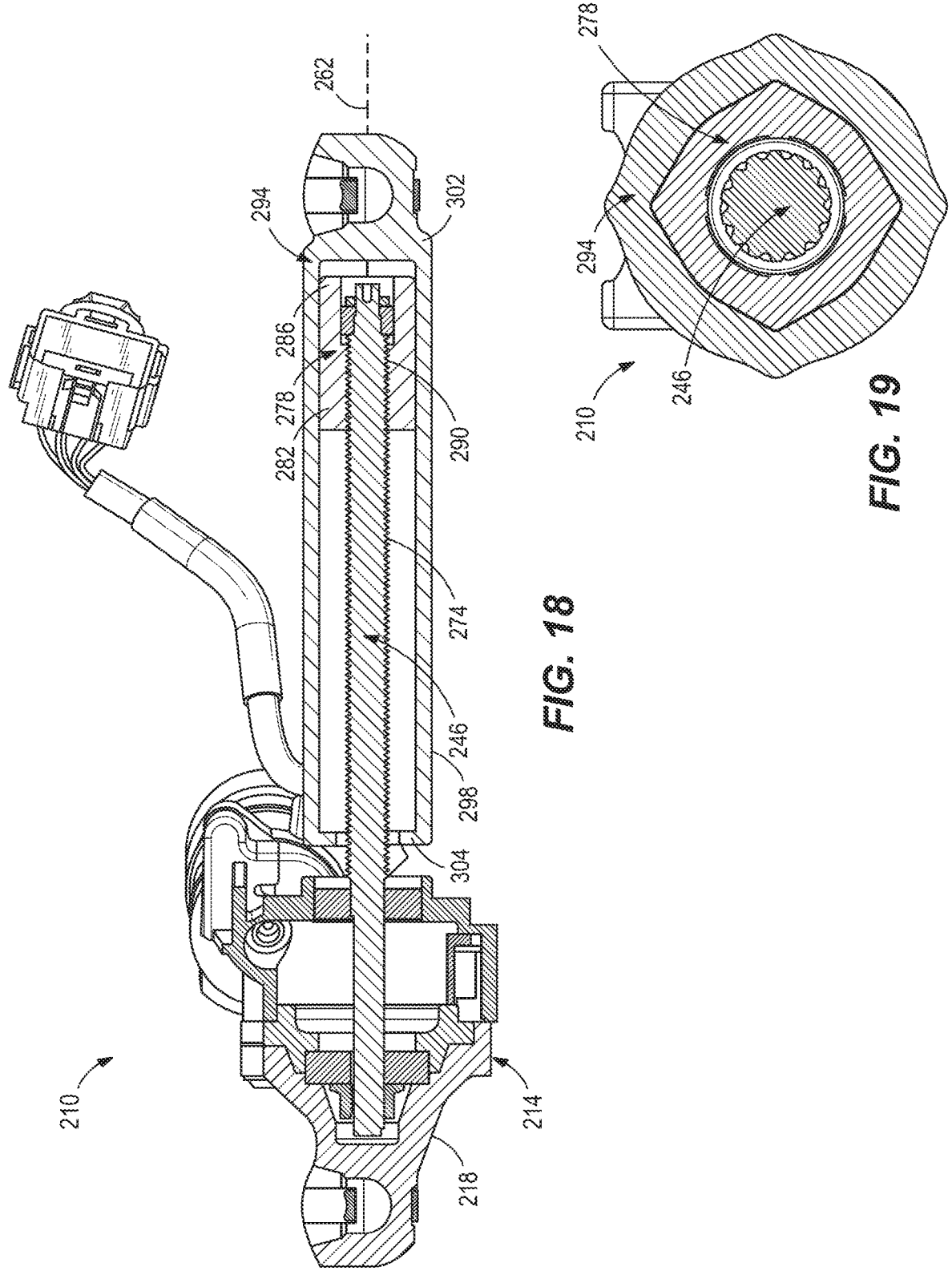
FIGS. 18 and 19 are cross-sectional views of an actuator according to another construction.

FIGS. 18 and 19 illustrate another construction of an actuator 210 for opening and closing the decklid 106. The actuator 210 is similar to the actuator 10, with the exception that the actuator 210 pulls the decklid 106 closed, whereas the actuator 10 pushes the decklid 106 closed. For example, the actuator 210 includes a motor 214 with a housing 218, and a rod 246 that extends from the motor 214 along a drive axis 262 (FIG. 18) and has external threads 274. The actuator 210 includes a first sleeve 278 that is coupled to and driven by the rod 246. The first sleeve 278 is a hollow tube having a first end 282 and a second end 286 spaced from the first end 282 along the drive axis 262. As illustrated in FIG. 18, the first sleeve 278 includes internal threads 290 that engage with the external threads 274 of the rod 246, such that when the rod 246 is rotated by the motor drive mechanism 226, the first sleeve 278 is moved linearly along the drive axis 262 (e.g., either to the left or right as viewed in FIG. 18).

The actuator 10 further includes a second sleeve 294 that is coupled to the first sleeve 278. In the illustrated construction, the second sleeve 294 is a hollow tube having a first end 298 and a second end 302 spaced from the first end 298 along the drive axis 262. As illustrated in FIG. 18, the second sleeve 294 is shaped to permit the second sleeve 294 to move along the drive axis 262 in a telescoping manner with respect to the first sleeve 278 and with respect to the rod 246 (e.g., to extended and retracted positions with respect to the housing 218). In this regard, the second sleeve 294 fits over the first sleeve 278 and in some embodiments can be held to the first sleeve 278 with a frictional fit. In any case, the fit between the first and second sleeves 278, 294 is loose enough such that the second sleeve 294 may be pushed and pulled along the first sleeve 278 with ease by the force of an operator lifting up on the decklid 106 with his or her hand.

With reference to FIG. 19, the first sleeve 278 and the second sleeve 294 of the actuator 210 can have geometric cross-sectional shapes along at least a portion of each of the first sleeve 278 and the second sleeve 294 that rotationally lock the first sleeve 278 to the second sleeve 294. Other constructions include different shapes than that illustrated.

With reference to FIG. 18, the first sleeve 278 is different than the first sleeve 78 of the actuator 10, and the second sleeve 294 is different than the second sleeve 94 of the actuator 10. Specifically, the first sleeve 278 is shorter in length along the drive axis 262 than the first sleeve 78 of the actuator 10 along the drive axis 62, although other lengths of the sleeves 78, 278 are possible while still performing the same functions of the actuators 10, 210 as described herein. Additionally, the first end 298 of the second sleeve 294 of the illustrated embodiment includes a stop 304 (e.g., a radially inwardly extending flange or wall). With reference to FIGS. 20-25, these differences, along with the location of the motor 214 relative to the decklid arm 110, enable to the actuator 210 to be used as a "pull" actuator instead of a "push" actuator.

FIGS. 20 and 21 illustrate a first position of the actuator 210 shown in FIGS. 18 and 19, in which the decklid 106 has been opened (e.g., manually opened). In this first position, the first sleeve 278 and the second sleeve 294 are positioned distally with respect to the motor 214. In this position, the stop 304 of the second sleeve 294 is in contact with the first sleeve 278 (FIG. 21), and prevents the second sleeve 294 from moving farther distally away from the first sleeve 278. As illustrated in FIG. 20, the second end 302 of the second sleeve 294 is coupled to the decklid arm 110 near the first end 114 of the decklid arm 110, similar to the actuator 10. However, the motor 214 is positioned on the other side of the decklid arm 110 as compared for example to the positioning of the motor 14 illustrated in FIG. 6.

Figure 22:
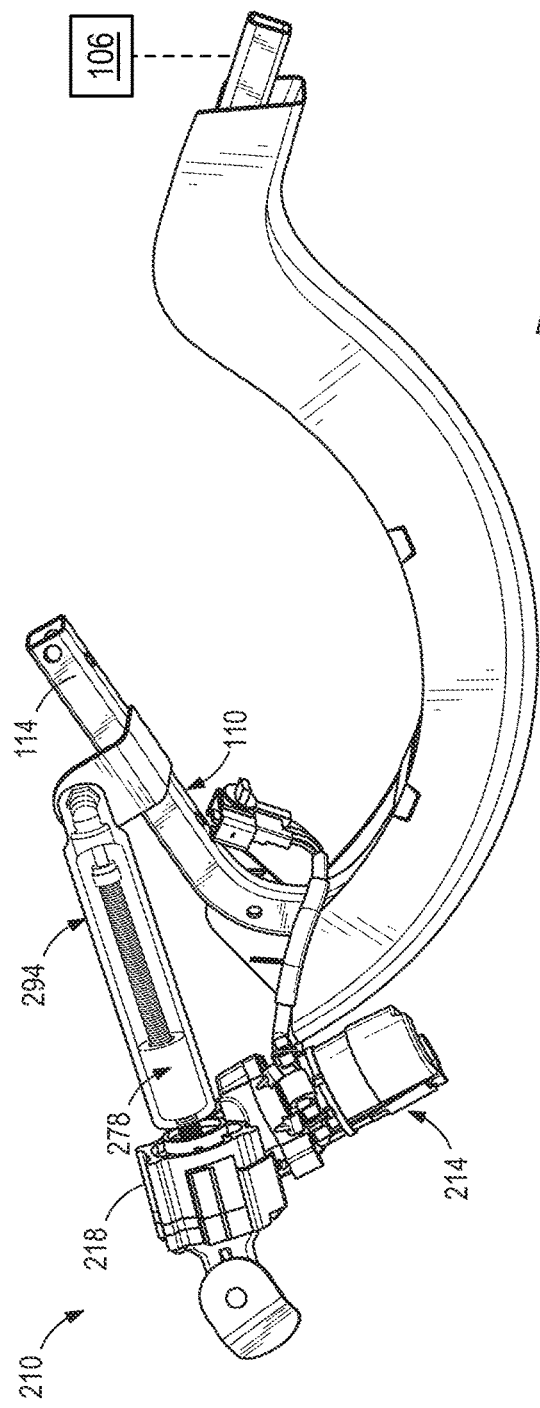
Figure 23:
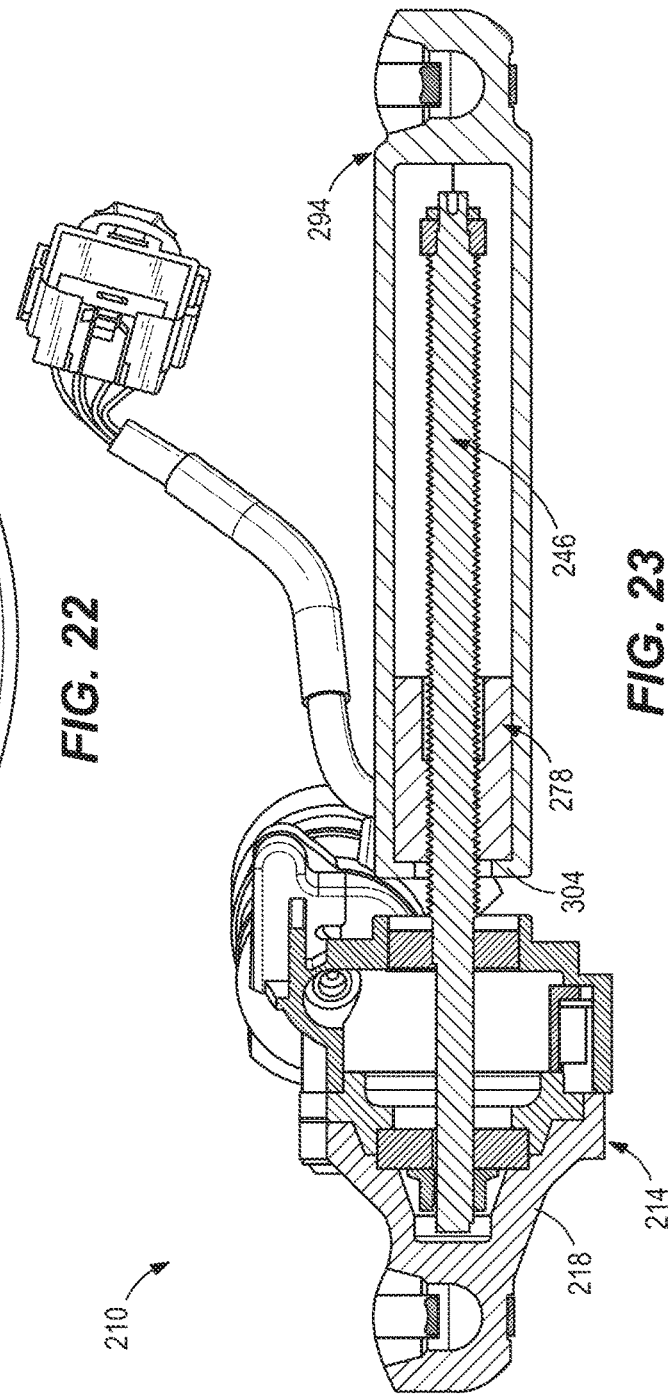

FIGS. 22 and 23 illustrate a second position of the actuator 210, in which the decklid 106 has been closed. In this second position, the motor 214 has been activated, causing the first sleeve 278 to slide linearly along the rod 246 toward the motor 214 and the housing 218. Movement of the first sleeve 278 in this direction "pulls" on the second sleeve 294 via contact of the first sleeve 278 with the stop 304 of the second sleeve 294.

FIGS. 24 and 25 illustrate a third position of the actuator 210, in which the decklid 106 is still closed, and in which the motor 214 is again activated, causing the first sleeve 278 to move back out (e.g., move in a telescoping manner) distally away from the motor 214 and the housing 218 and toward the second end 302 of the second sleeve 294. The second sleeve 294 remains in place as the first sleeve 278 slides within the second sleeve 294, due to the sliding arrangement between the first and second sleeves 278, 294. Once the third position is established, the actuator 210 is ready for a user to manually open the decklid 106 again, thus moving the second sleeve 294 back to the first position illustrated in FIGS. 20 and 21.

Although the invention has been described in detail with reference to certain preferred embodiments, variations and modifications exist within the scope and spirit of one or more independent aspects of the invention as described. For example, although the embodiments described above are applied to a vehicle decklid, it will be appreciated that any of the actuator embodiments disclosed herein can be used for moving any other type of vehicle closure, including without limitation a sliding door, liftgate, or tailgate of a vehicle.

What is claimed is:

1. An actuator for opening and closing a decklid on a motor vehicle, the actuator comprising:
   a motor;
   a rod coupled to and driven by the motor;
   a first sleeve coupled to and driven by the rod; and
   a second sleeve coupled to and driven by the first sleeve;
   wherein the first and second sleeves are slidably coupled to one another, such that the motor is configured to linearly drive the first sleeve relative to the second sleeve;
   wherein the first sleeve is driven by the rod to translate between extended and retracted positions along a drive axis, and wherein the rod includes a stop member that projects radially away from the drive axis, wherein the first sleeve includes a first end having a first internal diameter and a second end having a second internal diameter, wherein the first internal diameter is smaller than the second diameter, such that when the first sleeve is moved along the drive axis, the stop member contacts the first end and limits translational movement of the first sleeve, and wherein the first sleeve and the second sleeve have geometric cross-sectional shapes that rotationally lock the first and second sleeves relative to one another.

2. The actuator of claim 1, wherein the rod is a threaded rod.

3. The actuator of claim 2, wherein the first end of the first sleeve includes internal threads that engage with external threads on the threaded rod.

4. The actuator of claim 3, wherein the second sleeve is unthreaded.

5. The actuator of claim 1, wherein the motor includes a housing, wherein the first and second sleeves are movable between a first state in which the first sleeve is positioned proximate the housing and the second sleeve is positioned away from the housing, a second state in which both the first and second sleeves are positioned proximate the housing, and a third state in which both the first and second sleeves are positioned away from the housing.

6. The actuator of claim 1, wherein the first and second sleeves are positioned in a telescoping arrangement, such that the first sleeve telescopes in and out of the second sleeve.

7. The actuator of claim 1, wherein both the first and second sleeves are hollow tubes.

8. An assembly for moving a decklid, the assembly comprising:
the actuator of claim 1; and
a decklid arm coupled to the second sleeve.

9. The assembly of claim 8, wherein the decklid arm is a curved, rigid arm that includes a first end coupled to a bracket and a second end coupled to a decklid.

10. An actuator for opening and closing a decklid on a motor vehicle, the actuator comprising:
a motor;
a rod coupled to and driven by the motor, wherein the rod extends along a drive axis;
a first sleeve coupled to and driven by the rod; and
a second sleeve coupled to and driven by the first sleeve;
wherein the first sleeve and the second sleeve are positioned in a telescoping relationship relative to one another along the drive axis such that the second sleeve is configured to slide axially over the first sleeve along the drive axis, wherein activation of the motor in one direction is configured to cause the first sleeve and the second sleeve to move together axially in a first direction along the drive axis, and wherein activation of the motor in another, opposite direction is configured to slide only the first sleeve in a second, opposite direction axially along the drive axis relative to the second sleeve.

11. The actuator of claim 10, wherein the rod is a threaded rod.

12. The actuator of claim 10, wherein the rod includes a stop member that projects radially away from the drive axis, wherein the first sleeve includes a first end having a first internal diameter and a second end having a second internal diameter, wherein the first internal diameter is smaller than the second diameter, such that when the first sleeve is moved along the drive axis, the stop member contacts the first end and limits translational movement of the first sleeve.

13. An assembly for moving a decklid, the assembly comprising:
the actuator of claim 10; and
a decklid arm coupled to the second sleeve.

14. An actuator for opening and closing a decklid on a motor vehicle, the actuator comprising:
a motor having a housing;
a rod coupled to and driven by the motor;
a first sleeve coupled to and driven by the actuator rod; and
a second sleeve coupled to and driven by the first sleeve;
wherein the first and second sleeves are movable between
a first state in which the first sleeve is positioned proximate the housing and the second sleeve is positioned away from the housing, a second state in which both the first and second sleeves are positioned proximate the housing, and a third state in which both the first and second sleeves are positioned away from the housing, wherein the motor is configured to move the first and second sleeves relative to one another, wherein the motor is configured to move the first and second sleeves from the third state to the first state, and wherein the first and second sleeves are in substantially the same axial positions with respect to one another in both the second and third states.

15. The actuator of claim 14, wherein the rod extends along a drive axis, wherein the rod includes a stop member that projects radially away from the drive axis, wherein the first sleeve includes a first end having a first internal diameter and a second end having a second internal diameter, wherein the first internal diameter is smaller than the second diameter, such that when the first sleeve is moved along the drive axis, the stop member contacts the first end and limits translational movement of the first sleeve.

16. An assembly for moving a decklid, the assembly comprising:
the actuator of claim 14; and
a decklid arm coupled to the second sleeve.

17. The actuator of claim 1, wherein the motor is configured to linearly drive the first sleeve relative to the second sleeve while the second sleeve remains stationary.

18. The actuator of claim 1, wherein the first sleeve and the second sleeve each have a non-circular, generally diamond-shaped cross-sectional shape.

19. The actuator of claim 10, wherein the first sleeve and the second sleeve have geometrical cross-sectional shapes that rotationally lock the first and second sleeves together.

20. A method of using the actuator of claim 14, comprising moving the first and second sleeves from the third state to the first state.

* * * * *